United States Patent
Carpenter et al.

(10) Patent No.: US 9,002,728 B2
(45) Date of Patent: *Apr. 7, 2015

(54) SYSTEMS AND METHODS FOR CAMPAIGN OFFERS AND REWARDS WITH OFFER SERVING ENGINE BASED ON DIGITIZED RECEIPT DATA

(71) Applicant: Dropbox, Inc., San Francisco, CA (US)

(72) Inventors: Steven A. Carpenter, San Francisco, CA (US); Erik Klein, San Jose, CA (US); George O'Brien, San Mateo, CA (US); Franck Chastagnol, San Carlos, CA (US); Jitendra Vaidya, San Jose, CA (US); Jack Tihon, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,727

(22) Filed: Dec. 13, 2012

(65) Prior Publication Data

US 2013/0103462 A1 Apr. 25, 2013

Related U.S. Application Data

(60) Provisional application No. 61/701,431, filed on Sep. 14, 2012, provisional application No. 61/701,437, filed on Sep. 14, 2012, provisional application No. 61/701,458, filed on Sep. 14, 2012, provisional application No. 61/701,477, filed on Sep. 14, 2012, provisional application No. 61/701,479, filed on Sep. 14, 2012.

(51) Int. Cl.
*G06Q 30/00* (2012.01)
*G06Q 30/02* (2012.01)

(52) U.S. Cl.
CPC ........ *G06Q 30/0249* (2013.01); *G06Q 30/0229* (2013.01); *G06Q 30/0214* (2013.01); *G06Q 30/0224* (2013.01); *G06Q 30/0251* (2013.01); *G06Q 30/0226* (2013.01); *G06Q 30/0233* (2013.01); *G06Q 30/0219* (2013.01); *G06Q 30/0207* (2013.01)

(58) Field of Classification Search
USPC ..................................... 705/14.25
See application file for complete search history.

(56) References Cited

U.S. PATENT DOCUMENTS

| | | | |
|---|---|---|---|
| 5,053,955 A | 10/1991 | Peach et al. |
| 5,056,019 A | 10/1991 | Schultz et al. |
| 5,664,115 A | 9/1997 | Fraser |
| 6,741,969 B1 | 5/2004 | Chen et al. |
| 2001/0032128 A1 | 10/2001 | Kepecs |

(Continued)

OTHER PUBLICATIONS

Final Office Action for U.S. Appl. No. 13/713,406, mailed on Mar. 6, 2014, 30 pages. Notice of Allowance for U.S. Appl. No. 13/713,432, mailed on Apr. 17, 2014, 25 pages.
Final Office Action for U.S. Appl. No. 13/713,479, mailed on Mar. 18, 2014, 32 pages.

(Continued)

*Primary Examiner* — John G Weiss
*Assistant Examiner* — Scott C Anderson
(74) *Attorney, Agent, or Firm* — Kilpatrick Townsend & Stockton LLP

(57) ABSTRACT

A campaign offers and rewards system includes an offer serving engine, and an analytics engine with data intelligence. The analytics engine compares information about similar goods or services sold by different entities, manufacturers or service providers to create product and service categories. A redemption engine is included.

18 Claims, 18 Drawing Sheets

(56) References Cited

U.S. PATENT DOCUMENTS

| | | |
|---|---|---|
| 2004/0260608 A1 | 12/2004 | Lewis et al. |
| 2005/0055275 A1* | 3/2005 | Newman et al. ............... 705/14 |
| 2005/0125340 A1 | 6/2005 | Lin et al. |
| 2005/0222906 A1* | 10/2005 | Chen ............................... 705/14 |
| 2006/0293948 A1 | 12/2006 | Weinblatt |
| 2008/0059302 A1* | 3/2008 | Fordyce, III et al. ........... 705/14 |
| 2008/0195596 A1 | 8/2008 | Sisk et al. |
| 2009/0187465 A1 | 7/2009 | Leggetter et al. |
| 2010/0017284 A1 | 1/2010 | Ross et al. |
| 2010/0223119 A1 | 9/2010 | Klish |
| 2010/0291907 A1 | 11/2010 | MacNaughtan et al. |
| 2011/0106698 A1 | 5/2011 | Isaacson et al. |
| 2011/0191168 A1 | 8/2011 | Schroedl et al. |
| 2011/0288928 A1 | 11/2011 | Patwa et al. |
| 2012/0072280 A1 | 3/2012 | Lin |
| 2012/0203618 A1 | 8/2012 | Roever |
| 2012/0226545 A1 | 9/2012 | Gebb et al. |
| 2013/0103471 A1 | 4/2013 | Carpenter et al. |
| 2013/0103473 A1 | 4/2013 | Carpenter et al. |
| 2013/0103475 A1 | 4/2013 | Carpenter et al. |
| 2013/0103476 A1 | 4/2013 | Carpenter et al. |
| 2013/0103481 A1 | 4/2013 | Carpenter et al. |

OTHER PUBLICATIONS

Notice of Allowance for U.S. Appl. No. 13/713,406, mailed on Jun. 6, 2014, 11 pages.

Notice of Allowance for U.S. Appl. No. 13/713,479, mailed on Jun. 9, 2014, 13 pages.

Non-Final Office Action for U.S. Appl. No. 13/713,368, mailed on Mar. 7, 2013, 18 pages.

Non-Final Office Action for U.S. Appl. No. 13/713,406, mailed on Mar. 7, 2013, 18 pages.

Non-Final Office Action for U.S. Appl. No. 13/713,748, mailed on Mar. 13, 2013, 11 pages.

Non-Final Office Action for U.S. Appl. No. 13/713,479, mailed on Mar. 14, 2013, 14 pages.

Non-Final Office Action for U.S. Appl. No. 13/713,432, mailed on Mar. 18, 2013, 20 pages.

Final Office Action for U.S. Appl. No. 13/713,748, mailed on Jul. 3, 2013, 13 pages.

Final Office Action for U.S. Appl. No. 13/713,368, mailed on Aug. 8, 2013, 14 pages.

* cited by examiner

```
░▒▓ CARRIER 3G      12:12 PM              🕐 🔋
```

| Is there a Logo? | | Line it up here |
|---|---|---|
| | ST# 1508 OP#   00003898 TE# 26   T(/)  09781<br>BE BC/CI / CT    001450001129  F        1.88 N<br>BE STMMXDVEG  001450001128  F        1.25 N<br>BE STMMXDVEG  001450001128  F        1.26 N<br>BOUNTY TOWLL   003100028318            1.00 X<br>BOUNTY TOWLL   003100028318            1.00 X<br>C/J CHEESE        002100060843 X        5.34 N<br>YOGURT              007047041597 F        2.00 N<br>YOGURT              007047041381 F        2.00 N<br>STRAWS              004288740965           1.76 X<br>LG GALA              000000004135XX<br>  0.73 lb  @    1 lb /1.57                1.15 N<br>EGGS                   081390600100 X        1.98 N<br>CRESCENT ROL   001800000401 F         1.98 N<br>CRESCENT ROL   001800000401 F         1.98 N<br>GV 2 RF MLK        007874236187 X        2.71 N<br>DRY DOG FOOD   068113117549           9.67 X<br>TT APPLE JCE     002870010271 X        2.28 N<br>TT APPLE JCE     002870010271 X        2.28 N<br>MM OJ                  002500004667 F        2.98 N<br>HALF    HALF      060538818716 F        1.68 N<br>GM CEREAL         001600040945 X        2.88 N<br>GM CEREAL         001600040945 X        2.88 N<br>GM CEREAL         001600040945 X        2.88 N<br>POPCORN            004166703626 F        2.00 N<br>TYS FUN NGTS    002370002856 F        5.27 N<br>TYS FUN NGTS    002370002856 F        5.27 N<br>COKE                   004900005014 F        1.00 O<br>COKE                   004900005014 F        1.00 O<br>SKIPPY PB           004800100643 X        2.77 N | |

Center your receipt between the guides. Don't worry if the receipt is too long. You'll get a chance to add to it later.

| Cancel | 📷 Take Photo |
|---|---|

*FIG. 2*

| Product ID | Brand Location | Category Location | Tags |
|---|---|---|---|
| ID 1 | UPC 1 | L3 Cat 1 | Recycled |
| ID 2 | UPC 2 | L3 Cat 8 | Reduced Fat, Baked |
| ID 3 | Sub-brand 9 | L2 Cat 2 | Unscented |
| ID 4 | UPC 3 | L3 Cat 9 | |
| ID 5 | UPC 3 | L3 Cat 9 | |

FIG. 9

*Admin    Product Admin Home    Products ▾    Brands ▾    Tags ▾    Categories ▾*

Product admin

*Products*
- *List of Products*
- *Create Products*
- *Batch Create Products*
- *Search Products*
- *Download Products*
- *Create Retailers*
- *List of Retailers*

*Brands*
- *List of Brands*
- *Create Brands*
- *Batch Create Brands*
- *List of Owners*
- *Create Owners*
- *Batch Create Owners*

*Tags*
- *List of Tags*
- *Create Tags*
- *Batch Create Tags*

*Categories*
- *List of Categories*
- *Create Categories*
- *Create Subcategories*
- *Create Subsubcategories*

FIG. 10

Offer server abstractions

| Offer | Flight | User Cohort |
|---|---|---|
| Unique identifier | Unique identifier | Unique identifier |
| Text to be displayed in the offer, including terms and conditions | Start and end dates for the flight | List of users in the cohort |
| Image assets to be displayed in the offer | Status of the flight (on, off, paused, etc.) | |
| Information detailing the rewards a user can receive from the offer | Budget for the flight | |
| Reference to the list of Product IDs that are eligible to count for offer redemption | Limits for sharing if the flight's offer is social | |
| Reference to the set of Product IDs and customer names that are competitive to the offer | User targeting info including demo, device, geo, and cohort requirements | |
| Customer sponsoring the offer | Customer sponsoring the offer | |
| Type of offer (standard, social, etc.) | Invoice number associated with the offer | |
| Offer age restrictions (i.e. 21+ for alcohol) | Identifier for the offer the flight will deliver | |
| | Priority level for the flight | |

*FIG. 14*

SYSTEMS AND METHODS FOR CAMPAIGN OFFERS AND REWARDS WITH OFFER SERVING ENGINE BASED ON DIGITIZED RECEIPT DATA

CROSS-REFERENCE TO RELATED APPLICATIONS

This application claims the benefit of U.S. 61/701,431, U.S. 61/701,437, U.S. 61/701,458, U.S. 61/701,477 and U.S. 61/701,479, all filed Sep. 14, 2012, which applications are fully incorporated herein by reference.

BACKGROUND

1. Field of the Invention

The present invention is related to campaign offers and rewards systems and methods, and more particularly to campaign offers and rewards systems and methods that process and extract information about items purchased based on any receipt.

2. Description of the Related Art

One of the most common concerns for many businesses is the need to develop fresh ways to acquire new customers and to retain current customers. There are currently a number of campaign offers and reward programs in place across many different merchants and products that attempt to build customer loyalty and attract new consumers. These types of programs tend to reward consumers for shopping frequently for products at the sponsoring merchant and are usually tied to the amount, not just the number, of purchases for a single shopping trip as well.

Incentive campaign reward programs, in which incentive companies contract with sponsoring companies for programs to promote sales of the sponsoring companies' products or services, are well-known. Incentive campaign reward programs include discount coupon programs; customer loyalty programs, such as frequent flyer programs, and promotional games, such as sweepstakes prizes, scratch-and-win games, and the like, in which a sponsoring company's products or services are won by successful participation in the incentive campaign reward program.

Incentive campaign reward programs offer rewards and incentives to modify behavior of individual consumers and to direct the consumers to some pre-determined action, such as purchase of products or services upon visiting a retail site, viewing advertising, testing a product, or the like. Companies use rewards and incentives to increase awareness of product offerings, to launch new products, to attract the attention of a newly identified audience, to differentiate products to encourage certain behavior, to obtain information, and for other purposes.

Traditional incentive campaign rewards and offers system campaign offers and rewards systems suffer drawbacks in terms of campaign creation, budgeting, convenience of tracking data, changing promotions, return on investment, and the like. For example, for a consumer who participates in multiple incentive programs it may take time and effort to track his or her participation in each program. For example, time is required to keep track of loyalty points earned in each separate incentive program. Therefore, when a consumer receives an offer to participate in an incentive program, the consumer may decide against participating in it, not because the incentive program is not attractive, but because the cost to the consumer, in terms of the time and effort to tracking another incentive program, exceeds the expected benefit of the incentive program. Accordingly, a consumer need has arisen for a streamlined system and method for tracking consumer participation in a variety of incentive programs from different sponsors.

A similar problem exists for sponsoring companies who wish to offer promotions. The collective costs of generating incentive campaign rewards programs, administering the programs, tracking the participation of consumers in the incentive campaign reward programs and fulfilling the rewards or prizes won in such incentive programs may exceed the benefits of offering the incentive campaign rewards program. These costs may be particularly high in instances where the activities associated with an incentive program must be carried out by different companies, or by different organizations within the same company. In just one small example, a clerk at a participating merchant may violate the terms of a particular campaign and allow a consumer to receive rewards on more than the campaign designated. Furthermore, the sponsor of a campaign may find itself rewarding its least economically attractive customers who are deal-driven and not likely to be brand advocates or loyalists in the future. Accordingly, a need has arisen for a unified campaign rewards and offers system that provides for program generation and administration, data tracking and rewards fulfillment.

Existing incentive campaign reward programs do not meet the entire consumer and sponsor needs associated with incentive programs. One form of incentive campaign rewards program that is used extensively is that of promotional mailings. The processing of promotions, i.e., providing the appropriate check or discount coupon to the customer as a reward for the initial purchase, involves high volume and labor intensive activity, including collection, verification and organization of initial proofs of purchase and related information, preparation of the checks, coupons or other items using preprinted stock provided by the sponsor in connection with the particular promotion, and finally the sorting of individual items based on their mailing destinations.

At any given time, a typical provider of promotion services is involved with many different promotions of various sponsoring manufacturers. Preprinted forms, when provided by different sponsors, can vary in size and shape, thus creating the need to handle individual promotions separately. This increases handling expense, not only in added labor, but also in the mailing cost, as it is difficult with a single promotion to accumulate a volume of items sufficient to qualify for certain reduced postage rates, e.g. the reduced rate available for mail presorted by zip code of the destination. Manual recombination and sorting of items for multiple promotions would be prohibitively expensive.

Another form of a promotional program is coupon distribution and redemption. Many problems exist with the traditional coupon distribution and redemption system. For example, few consumers will go through all the steps necessary to redeem their coupons, and the consumers who do go to the trouble of redeeming coupons are disproportionately extremely price-sensitive and adept at extracting maximum value from incentive programs, often combining multiple coupons and store coupons to receive products at little to no out of pocket cost, making their redemptions a money-losing proposition for the product's manufacturer and limiting the effectiveness of the overall campaign. Additionally, many more attractive consumers forget to bring coupons that they have clipped and saved to the store. Thus, reluctance by a "typical" consumer to take all necessary steps partially defeats the manufacturer's purpose for offering the purchase incentive. A manufacturer distributes coupons with the expectation that the coupons will induce sales of its product by offering a discount. However, when the coupon is forgotten or disregarded, the consumer is usually not aware of the incentive when he is selecting a product among different brands at the retail store.

A further problem with coupon redemption systems is verification. Because the verification of redemption conditions is performed by a check-out clerk using point of sale (POS) systems, sometimes the programming of the POS systems do not properly enforce a campaign's rules. As a result, some campaigns are oftentimes overcharged for offers without the benefit of the required purchase.

The introduction of the digital computer and the computer network eliminates some of the inconveniences of conventional incentive campaign rewards programs, particularly those that relate to data tracking and manipulation. The digital computer is a powerful data processing tool that allows a user to organize, store and analyze data at volumes and rates that would be impossible by any prior known techniques.

Computers have been used in connection with incentive campaign rewards programs and other programs that have characteristics in common with incentive programs, but known computer incentive programs address some, but not all of the drawbacks of traditional promotions. For example, U.S. Pat. No. 5,053,955 to Peach et al. discloses an improved process of printing and assembling coupons. Peach et al. discloses a computer-based system for merging certain information for various promotions, so that a single stream of data can be used as a source for printing and mailing coupons for multiple promotions. Thus, the system of Peach et al. reduces some of the paperwork associated with single-promotion systems, but it merely mitigates, rather than solves, the problems inherent in paper-based promotions.

Computer-based promotional games are also known. Such games include scratch-and-win games, treasure hunts, video pinball and the like. Such incentive programs have advantages over paper promotions, in that data regarding participation is easily stored and manipulated. However, existing incentive campaign reward programs do not solve all consumer and sponsor needs. In particular, such promotional games do not assist consumers in tracking participation in multiple promotions and do not assist sponsors in generating incentive programs, tracking participation in incentive programs and fulfilling rewards and prizes.

Computer-based systems exist for tracking some aspects of consumer participation in incentive programs. For example, U.S. Pat. No. 5,056,019 to Schultz et al. discloses an automated purchase reward accounting system and method. In particular, Schultz et al. discloses a marketing method for providing manufacturer purchase reward offers by automatically tracking the purchases of member consumers through the use of bar-coded membership cards and using the purchase records in a data processing system to determine if the required purchases have been made to earn a reward. Each member consumer receives a reward booklet disclosing the available reward offers, a periodic status report indicating the member consumer's progress toward earning rewards, and a reward certificate for those rewards earned. The card-based system of Schultz takes advantage of certain data processing capabilities of computer systems and certain data storage capabilities of electronic card technologies; however, among other drawbacks, the system of Schultz does not address the need for a system that assists sponsor companies in generating incentive programs, in tracking participation of consumers in multiple incentive programs, or in fulfilling rewards.

The computer network offers the possibility of improved systems for offering incentive programs and for tracking participation in an incentive program. By linking together several computers and by providing shared resources and cross-platform communications, the computer network provides improved access to sophisticated applications by users at remote locations.

One of the most widely accepted and heavily used networks is the Internet. The Internet is a global system of interconnected computer networks formed into a single world-wide network. A user, through the Internet, can interactively transmit messages with users in different countries. Similarly, a user in the U.S. connected to files and libraries and other jurisdictions such as Europe and Asia can download files for personal use. Accordingly, the Internet computer network provides strong communications functions similar to the communications functions provided by ham radio operators. Moreover, the Internet computer network acts like a universal library, providing electronic access to resources and information available from Internet sites throughout the world.

Various systems and methods are known which permit a sponsor to track data of multiple parties in databases and to update information in the databases based on transactions entered into by the parties to the transactions. For example, U.S. Pat. No. 5,664,115 to Fraser discloses an interactive computer system to match buyers and sellers of real estate using the Internet. Similarly, banks, credit card companies, and other financial institutions have developed computer-based systems that track client account information and update the information upon entry of various transactions. Some such systems involve use of electronic cards and operate over computer networks. Such systems have requirements peculiar to their respective industries, and none of the existing systems address all of the problems inherent in known incentive programs, particularly the problem of the need for an incentive program system that conveniently tracks participation while offering automated generation of incentive campaign reward programs and automated fulfillment of rewards won in incentive programs.

Computer incentive campaign reward programs are offered on the Internet; however, such systems are generally offered by a single sponsor and are generally limited to offering consumers the ability to participate in incentive programs. Known campaign offers and rewards systems do not offer sponsors the ability to conveniently generate incentive programs, to track participation of consumers in multiple incentive programs, or to provide for automated fulfillment of rewards.

Another important drawback of known computer incentive campaign rewards program systems is that the obligation to fulfill the rewards promised in a promotional campaign is often a logistically difficult and expensive task. The coordination of delivering or arranging for the retrieval of the rewards for the specified winner, in volumes that permit successful incentive programs, requires coordination of prize inventory, systems and information.

There are numerous problems with current incentive campaign rewards programs. The people who receive and redeem offers, such as coupons, may not have the purchasing characteristics to make the incentive, provided by the offer efficient for the marketer. When an offer, i.e., coupon, is distributed to a large population, and not tied to an individual, the number of redemptions is not known at the time of creation and distribution. There is a great deal of uncertainty in determining the redemption rate of that offer (i.e., coupon), and the associated costs to merchants or product producers, e.g. the campaigner. Current campaign rewards programs do not provide the campaigner with certainty about how much of a campaign will be redeemed. Another problem with campaign reward programs and systems is that they do not look at the state of a campaign budget and make a decision as to whether it makes sense to give a proposed recipient the offer. Yet another problem is that campaign reward programs of today do not have a cross-retailer shopper's purchaser history and the brand offer requirements, e.g. the budget of the campaign. Still a further problem of campaign reward programs is that there is a lack of control of the redemption mechanism.

There is a need for campaign offers and rewards systems that process and extract information about items purchased based on a digitized receipt. There is a need for campaign offers and rewards systems that provide offer creation, distribution and redemption, payment, fraud detection, and campaign reporting. There is a need for campaign offers and rewards systems that control an offer's redemption mechanism for campaign rewards. There is a need for campaign offers and rewards systems that processes receipts in real time as they are received. There is a need for campaign offers and rewards systems that enable advertisers to create multiple purchase offers over time and run simultaneous campaigns. There is a need for campaign offers and rewards systems with a predictive model function that uses information from receipt processing and determines values representing statistical correlations from the receipt processing. There is a need for campaign offers and rewards systems with analytics that performs analysis of shopper purchase data without integration with retailer POS systems.

There is a need for campaign offers and rewards systems that has taxonomy of products from different product advertisers. There is a need for campaign offers and rewards systems that, (i) predicts a probability that a shopper will redeem a given offer, (ii) estimate the reward the shopper will be owed when it redeems the offer, (iii) calculates an expected amount of a campaign budget that will be consumed if the shopper is presented with that offer, (iv) estimates a payout that the campaign sponsor is likely to realize by providing the shopper with the offer, and (v) appropriately transfers payment for a validated offer from the campaign budget to the shopper. There is a need for campaign offers and rewards systems that identifies receipt data, including line items, and ties SKU's from different receipts to create a list of products and services not matched to advertisers. There is a need for campaign offers and rewards systems that creates and uses taxonomy for goods and services to compare information about similar goods or services sold by different entities, retailers or service providers. There is a need for campaign offers and rewards systems that controls redemption of rewards in view of a reward budget, and turns off the campaign when a campaign budget has been met. There is a need for campaign offers and rewards systems that provide an advertiser with a certainty about how much of a campaign offer budget will be spent. There is a need for campaign offers and rewards systems that can estimate long term revenue which a campaign sponsor is likely to realize by providing the shopper with the offer. There is a need for campaign offers and rewards systems that can be coupled to a mobile device, a payment system, a digitized receipt on any platform and has a campaign that offers API configured to be interfaced with a third party platform. There is a need for campaign offers and rewards systems coupled to a social network that provides a social offer from one social network member to another social network member and connects to an offer for advertiser digital properties to a social network member. There is a need for a campaign offer and rewards system that, (i) collects and analyzes user data to reduce fraud, (ii) performs detection of suspicious activity, (iii) verifies the suspicious activity and (iv) in response to a detection of fraud applies a punishment.

These and other objects of the present invention are achieved in, a campaign rewards and offers system. A receipt intelligence engine includes receipt processing that in operation extracts information about items purchased based on an image of a receipt from at least one of a shopping trip and an electronic receipt from an online or offline transaction. An analytics engine includes data intelligence coupled to the receipt processing and performs analysis of the receipt. In response to processing and analysis, an offer is then sold.

SUMMARY

An object of the present invention is to provide campaign offers and rewards systems, and their methods of use, that process and extract information about items purchased based on a digitized receipt.

Another object of the present invention is to provide campaign offers and rewards systems that provide offer creation, distribution and redemption.

A further object of the present invention is to provide campaign offers and rewards systems, and their methods of use, that control an offer's redemption mechanism for campaign rewards.

Still another object of the present invention is to provide campaign offers and rewards systems, and their methods of use, that process receipts in real time as they are received.

Yet another object of the present invention is to provide campaign offers and rewards systems, and their methods of use, that enable advertisers to create multiple purchase offers based on product purchases made over multiple shopping trips and to run simultaneous campaigns.

Another object of the present invention is to provide campaign offers and rewards systems, and their methods of use, with a predictive model function that uses information from receipt processing and determines values representing statistical correlations from the receipt processing.

A further object of the present invention is to provide campaign offers and rewards systems, and their methods of use, that perform analysis of shopper purchase data without integration with retailer POS systems.

Still a further object of the present invention is to provide campaign offers and rewards systems, and their methods of use, that have a taxonomy of products from different product advertisers.

Another object of the present invention is to provide campaign offers and rewards systems, and their methods of use, that, (i) predict a probability that a user will redeem a given offer, (ii) estimate the reward the user will be owed when it redeems the offer, (iii) calculate an expected amount of a campaign budget that will be consumed if the user is presented with that offer, and (iv) estimate a payout that the campaign sponsor is likely to realize by providing the user with the offer.

Yet another object of the present invention is to provide campaign offers and rewards systems, and their methods of use, that identify receipt line items and tie SKU's from different receipts to create a list of products and services not matched to advertisers.

A further object of the present invention is to provide campaign offers and rewards systems, and their methods of use that create and use taxonomy for goods and services to compare information about similar goods or services sold by different entities, retailers or service providers.

Still another object of the present invention is to provide campaign offers and rewards systems, and their methods of use, that control redemption of rewards in view of a reward budget, and turns off the campaign when a campaign budget has been met.

Another object of the present invention is to provide campaign offers and rewards systems, and their methods of use, that provide an advertiser with a certainty about how much of a campaign offer budget will be spent.

Yet another object of the present invention is to provide campaign offers and rewards systems, and their methods of use, that can estimate long-term revenue which a campaign sponsor is likely to realize by providing the user with the offer.

A further object of the present invention is to provide campaign offers and rewards systems, and their methods of use, that can be coupled to a mobile device, a payment system, a digitized receipt on any platform, and has a campaign offers API configured to be interfaced with a third party platform.

Still another object of the present invention is to provide campaign offers and rewards systems, and their methods of use, coupled to a social network that provide a social offer from one social network member to another social network member connected to an offer(s) and receipt data, and for advertiser digital properties to a social network member connected to an offer(s) and receipt data.

Another object of the present invention is to provide campaign offers and rewards systems, and their methods of use, that, (i) collects and analyzes user data to reduce fraud, (ii) performs detection of suspicious activity, (iii) verifies the suspicious activity and (iv) in response to a detection of fraud applies a punishment.

These and other objects of the present invention are achieved in a campaign rewards and offers system. A receipt intelligence engine includes receipt processing that in operation extracts information about items purchased based on an image of a receipt from at least one of a shopping trip and an electronic receipt from an online or offline transaction. An analytics engine includes data intelligence coupled to the receipt processing and performs analysis of the receipt. In response to processing and analysis, an offer is then sold.

In another embodiment, a campaign rewards and offers system has a receipt intelligence engine that includes receipt processing. The campaign rewards and offers system extracts information about items purchased based on an image of a receipt from at least one of a shopping trip and an electronic receipt from an online or offline transaction. An analytics engine includes data intelligence coupled to the receipt processing and performs analysis of the receipt. In response to processing and analysis, an offer is then sold.

These and other objects of the present invention are achieved in, an offers or campaign rewards system that includes an offer serving engine, and an analytics engine with data intelligence. The analytics engine compares information about similar goods or services sold by different entities, manufacturers or service providers to create product and service categories. A redemption engine is included.

BRIEF DESCRIPTION OF THE DRAWINGS

FIG. 2 illustrates an embodiment of the present invention where digitized receipt data can be submitted for use with the campaign offers and rewards systems.
FIG. 9 illustrates an embodiment tags allow for the identification useful to a marketer for research or offer-targeting purposes, but which could not be easily captured in the existing taxonomies without creating significant additional complexity in their structures.
FIG. 10 illustrates that the data analytics engine can identify receipt line items from two different retailers that refer to the same underlying product.
FIG. 14 illustrates that to determine the slate of offers that it should display to the user, the campaign offers and rewards system mobile application regularly requests a slate of offers from the campaign offers and rewards system offer engine and where the offer engine represents the contracts that the campaign rewards and offers system has signed with customers to run offer campaigns with two abstractions: offers and flights.

DETAILED DESCRIPTION

Figure 1:
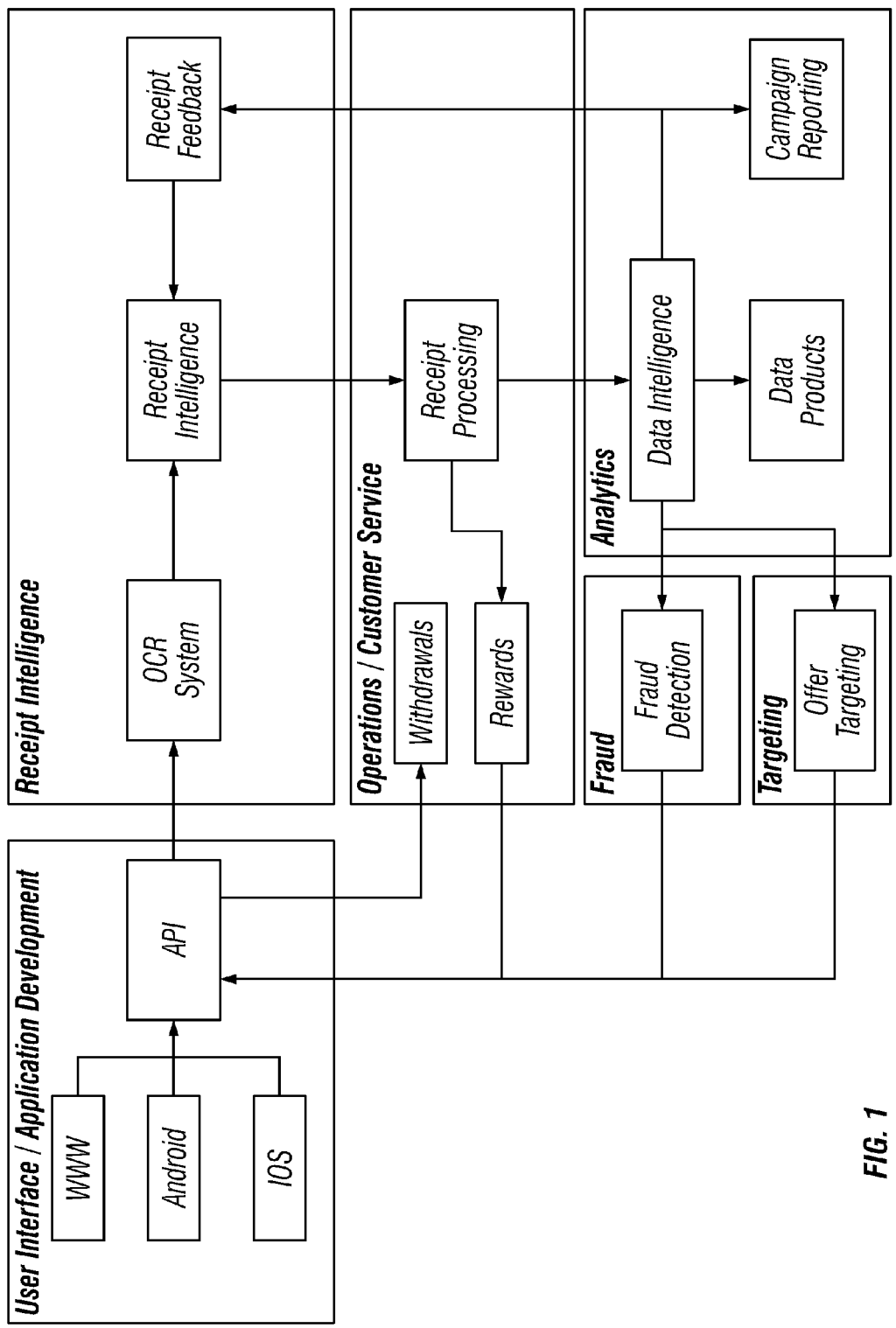
FIG. 1 illustrates an overall system diagram of an embodiment of the campaign offers and rewards systems of the present invention.

As used herein, the term "engine" refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term "database" is used broadly to include any known or convenient means for storing data, whether centralized or distributed, relational or otherwise.

As used herein, the term "mobile device" includes but is not limited to, a cell phone, such as Apple's® iPhone®, other portable electronic devices, such as Apple's® iPod®Touches, Apple's® iPods®, and mobile devices based on the Google® Android® operating system, and any other portable electronic device that includes software, firmware, hardware, or a combination thereof that is capable of at least receiving the signal, decoding if needed, exchanging information with a transaction server to verify the buyer and/or seller's account information, conducting the transaction, and generating a receipt. Typical components of a mobile device may include but are not limited to persistent memories like flash ROM, random access memory like SRAM, a camera, a battery, LCD driver, a display, a cellular antenna, a speaker, a Bluetooth® circuit, and WIFI circuitry, where the persistent memory may contain programs, applications, and/or an operating system for the mobile device.

Campaign Reward is defined as compensation for the successful completion of an offer, either financial or non-financial remuneration.

Offers is defined as containing a product(s) name, product(s) image, product(s) copy, reward value, reward limit, time period, and terms.

Advertiser is defined as the entity paying for the Rewards and authorizing the offers.

User is defined as a shopper who purchases products, submits receipts, views offers, and/or receives rewards.

The present invention is directed generally to campaign offers and rewards systems and methods that reward users for buying products or services, and more particularly, enable consumer product companies to market at the individual shopper level in any store their products are sold, with shoppers earning rewards for purchasing their selected products and brands.

The present invention provides campaign offers and rewards systems and methods for consumer brands, and more particularly, ties digital initiatives to in-store shopping without POS integration or coupons. In various embodiments, the campaign offers and rewards systems and methods of the present invention, (i) have an offer engine(s) that is aware of the user, given the offer, and the current state of the campaign that the campaigner has initiated, to provide knowledge about certainty how much will be redeemed, (ii) have one or more engines that can include servers that looks at the current state of the budget, and makes a decision as to whether it makes sense to give the user the offer, (iii) include shopper purchaser histories with brand offer requirements, e.g. the budget of the campaign and (iv) control the redemption mechanism.

Many consumer brands, including consumer products companies, have established a digital infrastructure on the Internet encompassing search ads, digital display ads (such as banners, video ads); websites; home pages on social media websites such as Facebook®, Twitter®; and mobile apps. With this infrastructure in place, consumer brands are now able to connect with different audiences directly. However, the biggest challenge for these consumer products companies is to "close the purchase loop" with these audiences: those who might view an online ad or have a direct relationship with a consumer brand on social media websites such as Facebook®, to those that actually purchase their products in stores. This has been solved for online e-commerce, where an Internet link can be used to track a click to a purchase online. The campaign offers and rewards system of the present invention solves this for offline purchases.

FIG. 1 illustrates an overall system diagram of an embodiment of the campaign offers and rewards system 10 of the present invention. As illustrated, a user interface/application 12 is coupled to, (i) a receipt intelligence engine 14, (ii) an operation/customer service engine 16, (iii) a fraud detection engine 18, (iv) a targeting engine 20 (v) an analytics engine 22, (vi) offer serving engine 24 and (vii) redemption engine 26.

Figure 11:
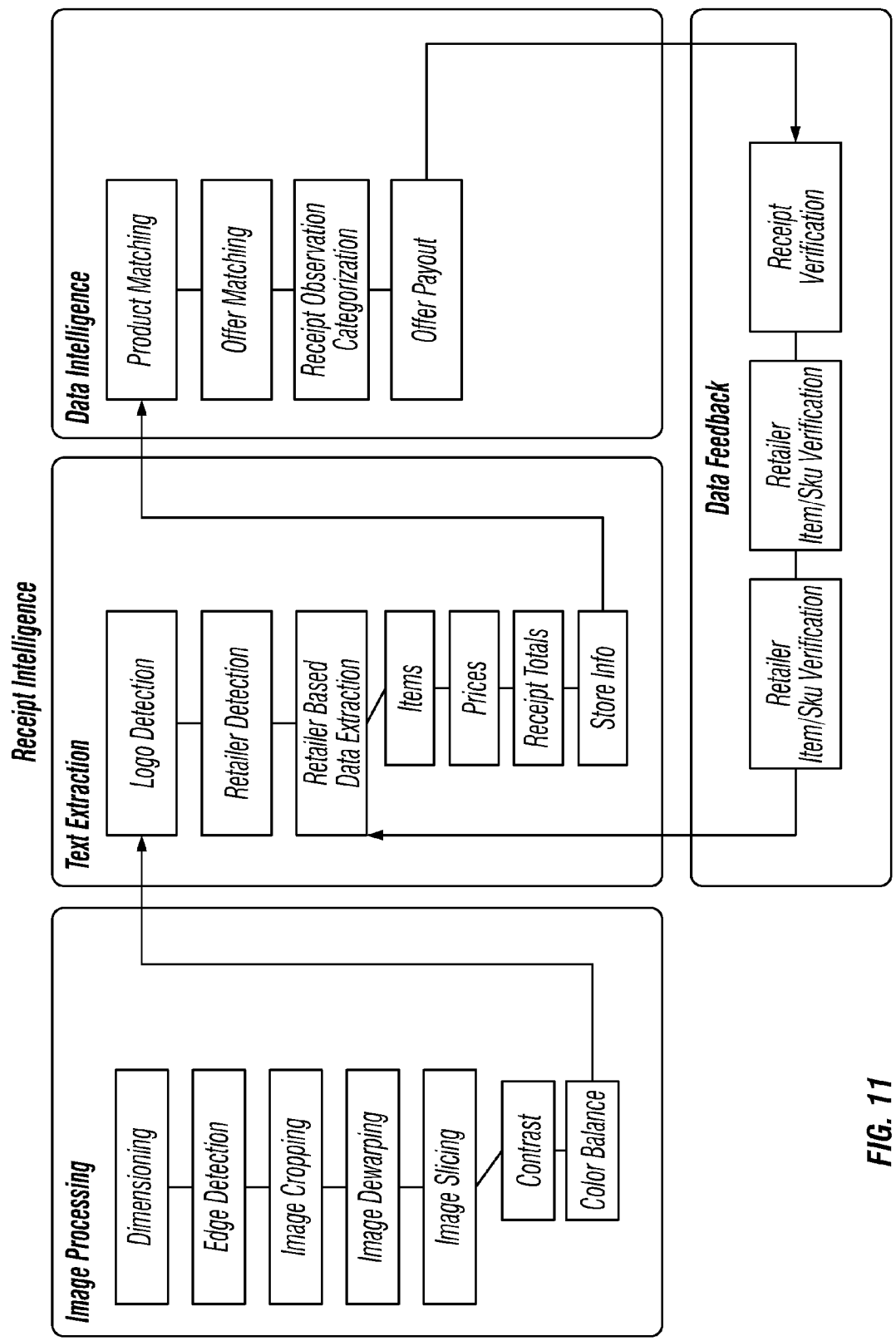
FIG. 11 illustrates one embodiment of receipt intelligence.
Figure 12A:
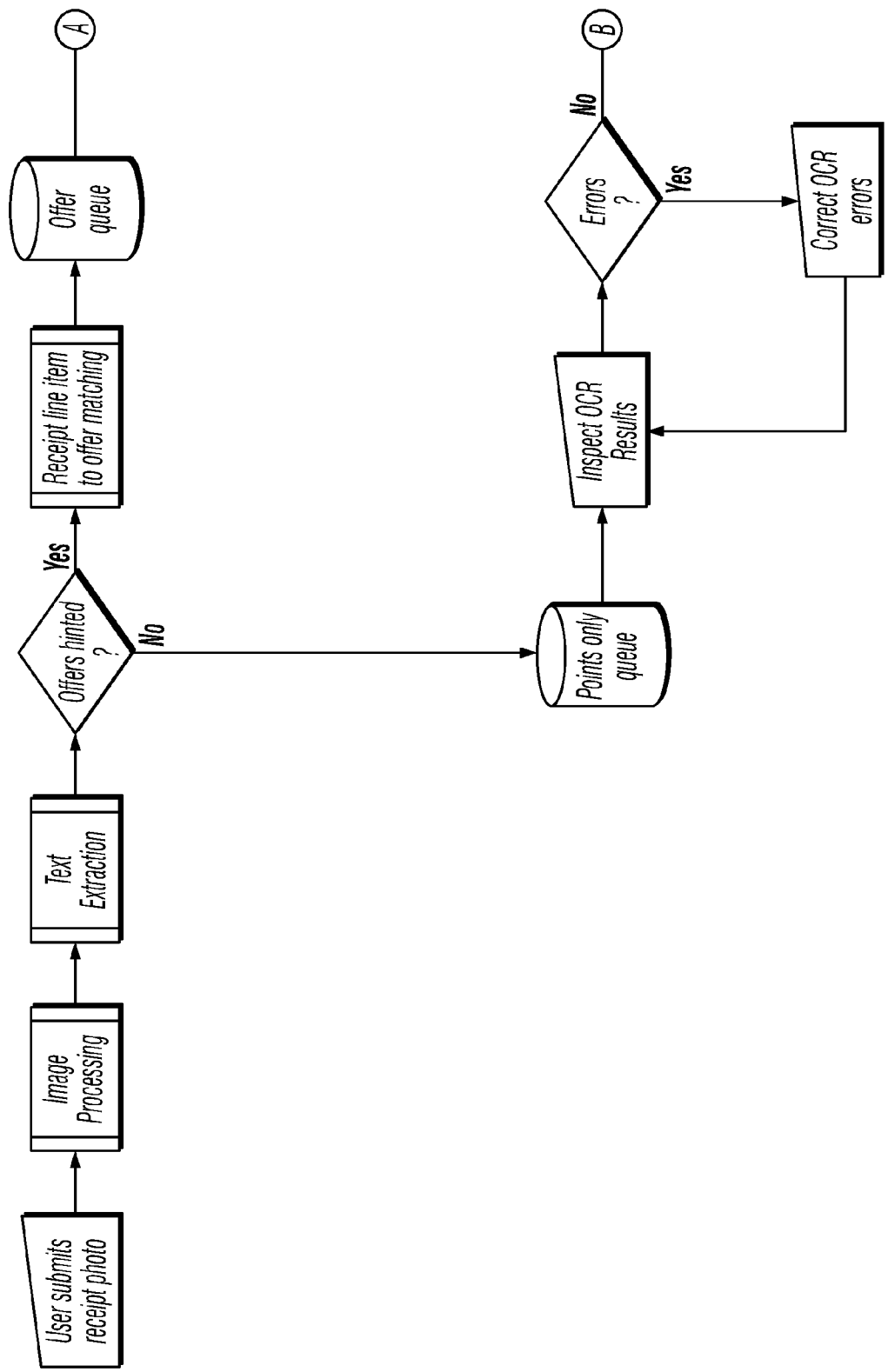
FIGS. 12(a)-(d) illustrate an embodiment of the operation of the operation/customer service engine.
Figure 12B:
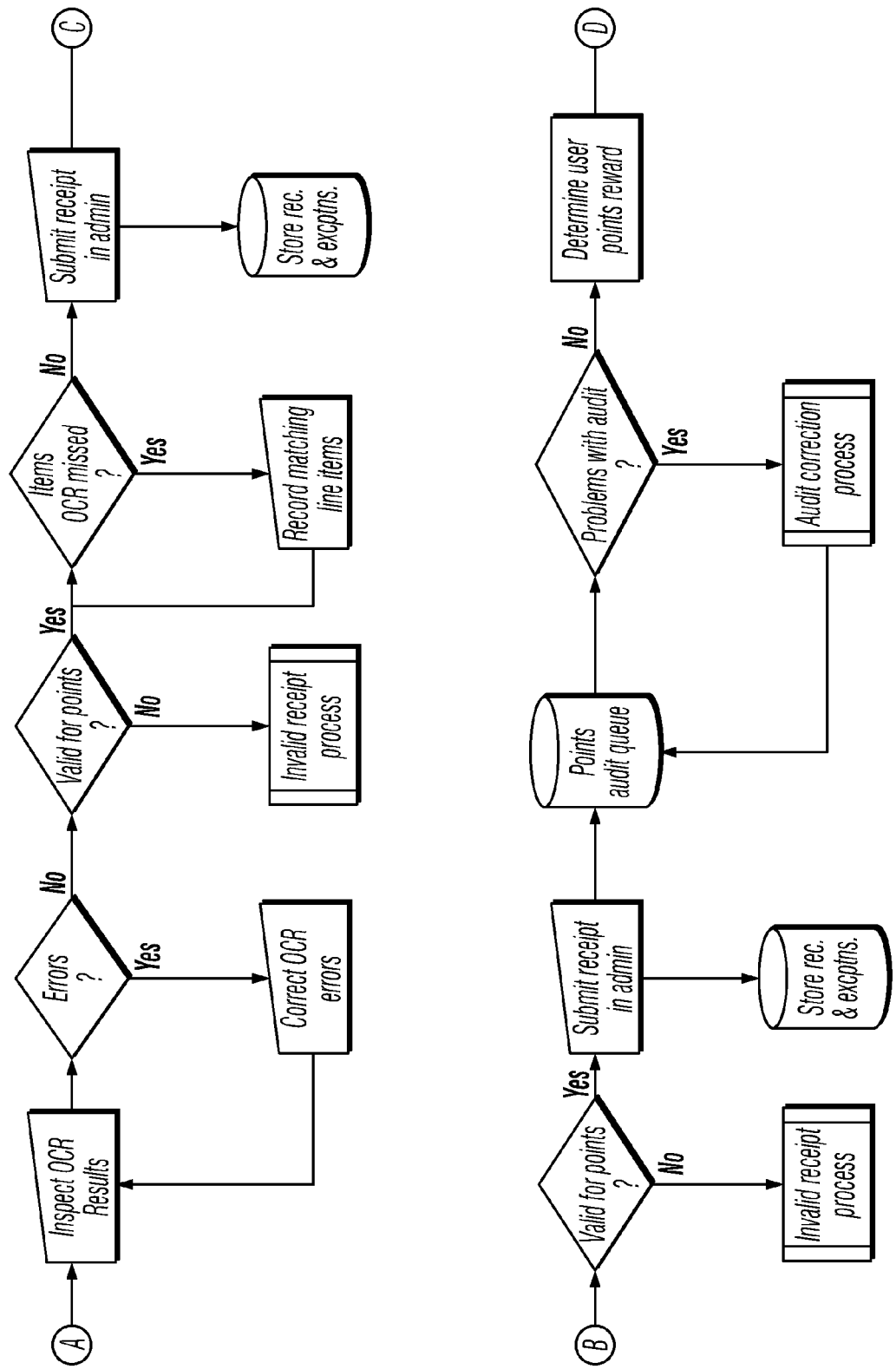
Figure 12C:
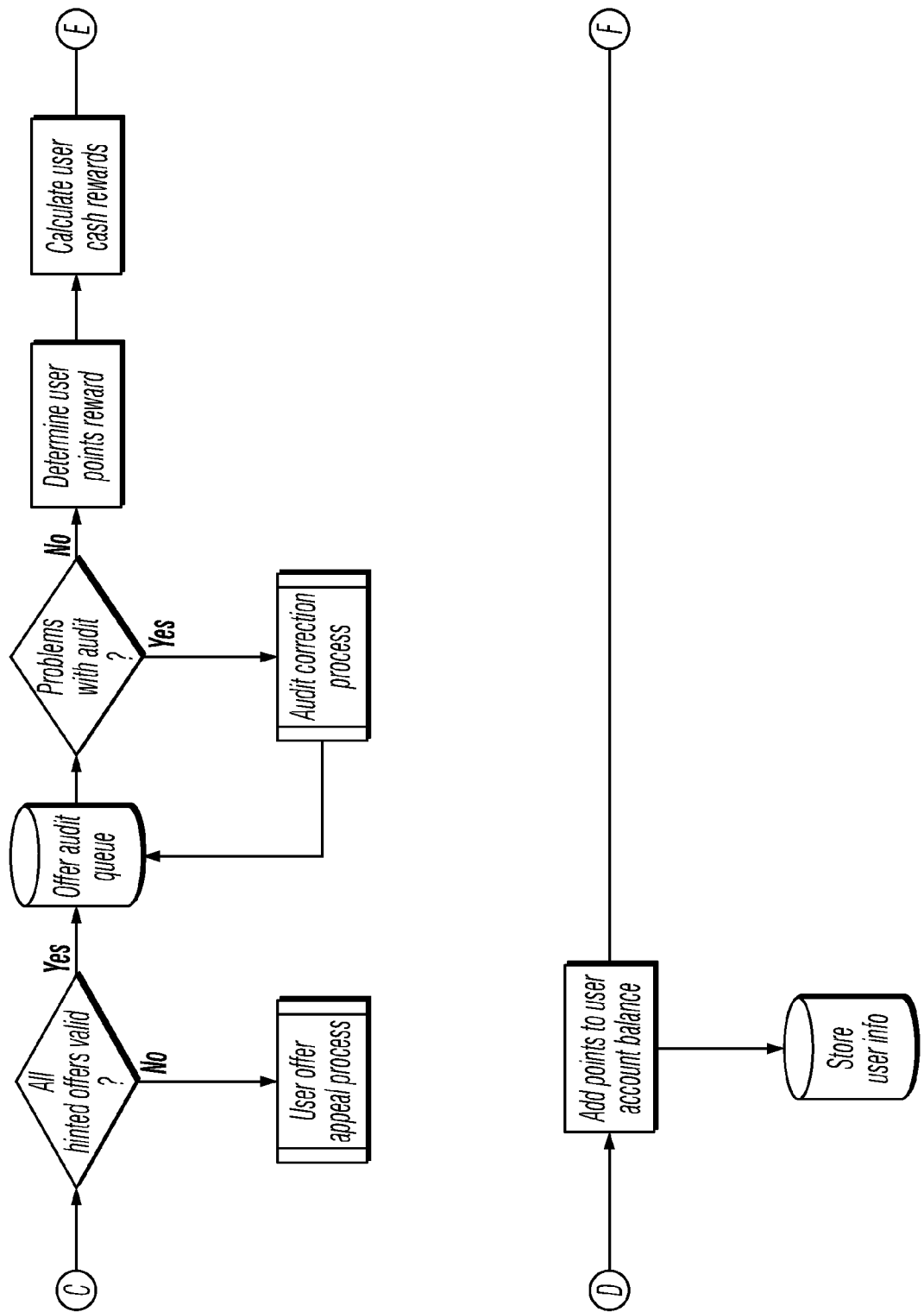
Figure 12D:
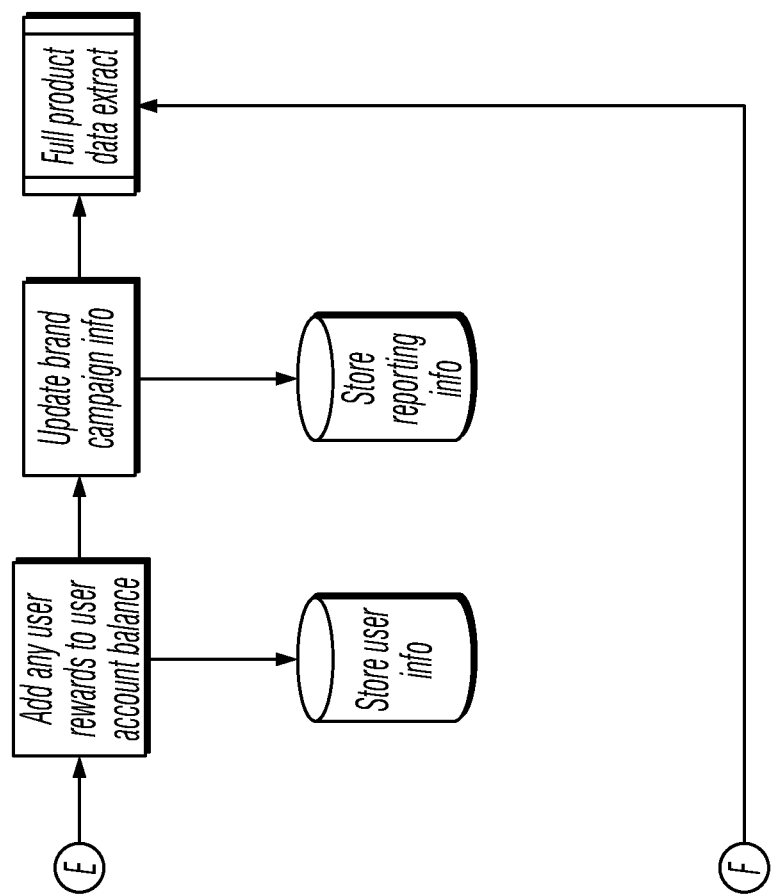

In one embodiment, the receipt intelligence engine 14 includes an optical character recognition ("OCR") system 28, or another device to read the receipt, receipt intelligence and receipt feedback. One embodiment of receipt intelligence is illustrated in FIG. 11. Other methods of submitting digitized receipt data and reading the receipt can be used.

The operations/customer service engine includes withdrawals coupled to the user interface, rewards coupled to the user interface, and receipt processing coupling to the receipt intelligence. FIGS. 12(a)-(d) illustrate an embodiment of the operation of the operation/customer service engine 16.

The fraud detection engine 18 is coupled to the targeting engine 20 which has offer targeting, and the analytics engine 22. The targeting engine 20 is coupled with the receipt intelligence engine 14 to serve personalized product and brand offers based on historical purchase data and shopper cohorts. The analytics engine 22 includes data intelligence coupled to the receipt processing, data products and campaign reporting.

The campaign offers and rewards systems 10 and methods of the present invention automatically match consumer product and brand offers to receipts and provides retailer, basket and shopper targeting, coupon fraud, analytics on user purchase behavior, analytics on competitive market share analysis, targeting based on geography, based on user history. The campaign offers and rewards systems 10 and methods of the present invention can target based on psychographic targeting, e.g. grouping people into profiles based on taste and the like.

A variety of information is provided in the receipt including but not limited to, banner, SKU, product shortname, card last 4, transaction ID, coupons (when present), location, date/time, price paid, total spent, tender type, loyalty card (when present) and the like.

The campaign offers and rewards systems 10 and methods of the present invention have their own taxonomy of a product-level, brand-level, manufacturer-level, and category-level ecosystem meant to provide and organize purchase data. The campaign offers and rewards system can use the text of a receipt and correlate it to the Uniform Price code ("UPC") or into the campaign rewards system own taxonomy on groups of products, both intra-manufacture and for the world of describing products.

As illustrated in FIG. 2, in one embodiment a photo can be taken of the receipt, although the system can receive the receipt in many different methods. The user forwards an electronic receipt, provides an email account to the merchant who goes to campaign rewards and offers system of the present invention instead of them, a third party with access to receipt data provides the receipt. The campaign offers and rewards system of the present invention provides the user with some way to then access it. By having user provide the campaign rewards and offers system of the present invention with authorization to access certain e-mails from their accounts, the present invention can integrate with digital vaults, including but not limited to Paypal® and the like, and other existing and emergent mobile payment solutions. The campaign rewards and offers system of the present invention can do integration with POS systems, where the user provides a key allowing the campaign rewards and offers system to retrieve at its back end all of their purchase information using that POS, as well as payment systems that also have access to product-level purchase data (i.e., Square, NFC, Isis).

In another embodiment, a mobile device can include applications that give brands any-store mobile channel to provide personalized offers tied to purchase history.

The campaign offers and rewards systems 10 and methods of the present invention have made improvements upon, and created several different offer types and in-store incentives without waiting for upgrades in legacy POS systems and traditional credit card infrastructure. These include but are not limited to: single purchase, multiple purchases from the same consumer products company or brand in the same shopping basket, multiple purchases of products over multiple shopping trips, social offers, loyalty offers and the like.

The campaign rewards and offers system of the present invention improves on traditional single purchase offers in several ways. A consumer brand can create a national product offer with customized artwork, different offer reward values, different products, different offer copy, and target the offer directly at desired customer segments without advanced planning, retailer coordination, or concern for "redemption rates" that can be used by shoppers in any store their products are sold.

In one embodiment of the present invention, a campaign offers and rewards system includes a receipt intelligence engine 14 with receipt processing that extracts information about items purchased based on a digitized receipt from at least one of a shopping trip and an electronic receipt from an online or offline transaction. The receipt is a physical or an electronic receipt and is from an online or offline transaction.

In one embodiment, the system provides offer creation, distribution and a redemption mechanism for campaign rewards. In one embodiment, the system has contracted offers for branded items. The system controls an offers redemption mechanism for campaign rewards. In one embodiment, the system processes the receipts in real time as they are received. In one embodiment, the system enables advertisers to create multiple purchase offers and run simultaneous campaigns.

The receipt intelligence engine 14 extracts receipt information, recognizes an offer purchase to provide the reward, as more fully explained hereafter. The receipt includes information selected from at least one of, retail banner, SKU, product shortname, last 4 digits of a payment method, transaction ID, coupons, location, date or time, price paid, total spent, tender type and identification of a loyalty card. A text of the receipt can be correlated to a UPC or into a campaign offers or system taxonomy on groups of products.

In one embodiment of the present invention, the receipt is a digital image. It will be appreciated that the receipt can be physical, an image of one, send by e-mail, other means, and the like. When the receipt is a digital image, the receipt intelligence engine 14 can include an optical character recognition system 28, receipt intelligence and receipt feedback. Receipt intelligence includes image processing coupled to text extraction that is coupled to data intelligence and coupled to data feedback. The image processing performs at least one of, dimensioning, edge detection, image cropping, image dewarping, image slicing, contract and color balance. Text extraction includes at least one of logo detection, retailer detection, retailer based data extraction, items, prices, receipt totals and information storage. Data intelligence includes at least one of, product matching, offer matching, receipt observation categorization and offer payout. Data feedback includes at least one of, retailer item or SKU verification, retailer item or SKU verification and receipt verification.

The system is configured to match consumer product and brand offers to receipts As a non-limiting example, the system provides one or more of, retailer-based targeting, basket-based targeting, shopper-based targeting, coupon fraud, analytics on user purchase behavior, analytics on competitive market share analysis, targeting based on geography.

In one embodiment, the receipt intelligence engine 14 receives an electronic receipt from a user who provides an email account to a merchant that couples to the campaign offers or reward system. The system in operation is granted authorization to access certain e-mails from a user's accounts.

An analytics engine 22 is coupled to the receipt intelligence engine 14. The analytics engine 22 includes data intelligence coupled to receipt processing, data products and campaign reporting. The analytics engine 22 identifies receipt line items and ties SKU's from different receipts. FIG. 10 illustrates that the data analytics engine 22 can identify receipt line items from two different retailers that refer to the same underlying product. It compares information about similar goods or services sold by different entities, manufacturers or service providers to create product and service categories.

The analytics engine 22 includes a predictive model function that uses information from receipt processing and determine values representing statistical correlations from the receipt processing. The analytics engine 22 includes data intelligence coupled to the receipt processing. In response to an analysis of the data intelligence, a decision is made relative to giving a user an offer for a reward. The analytics engine 22 performs analytics on at least one of, users who have viewed the offer, users who have redeemed the offer, a number of units or products purchased, receipts submitted with redemptions, money spent on a product or service, rewards paid out, money spent on product per a selected dollar amount in rewards, performance against system benchmarks, detailed retailer, state and SKU record for each purchase and the like. In one embodiment, the analytics engine 22 performs analysis of user purchase data without integration with retailer POS systems. As a non-limiting example, the analysis of consumer purchase data can include one or more of, users who have viewed the offer, users who have redeemed the offer, a number of units or products purchased, receipts submitted with redemptions, money spent on the product, rewards paid out, money spent on product per a selected dollar amount in rewards, performance against system benchmarks, detailed retailer, state and SKU record for each purchase and the like.

In one embodiment, the system is coupled to one or more POS system and a user can provide the system with authorization to retrieve selected user purchase information using that POS. Additionally, the user can provide authorization to have access to product-level purchase data.

Figure 6:
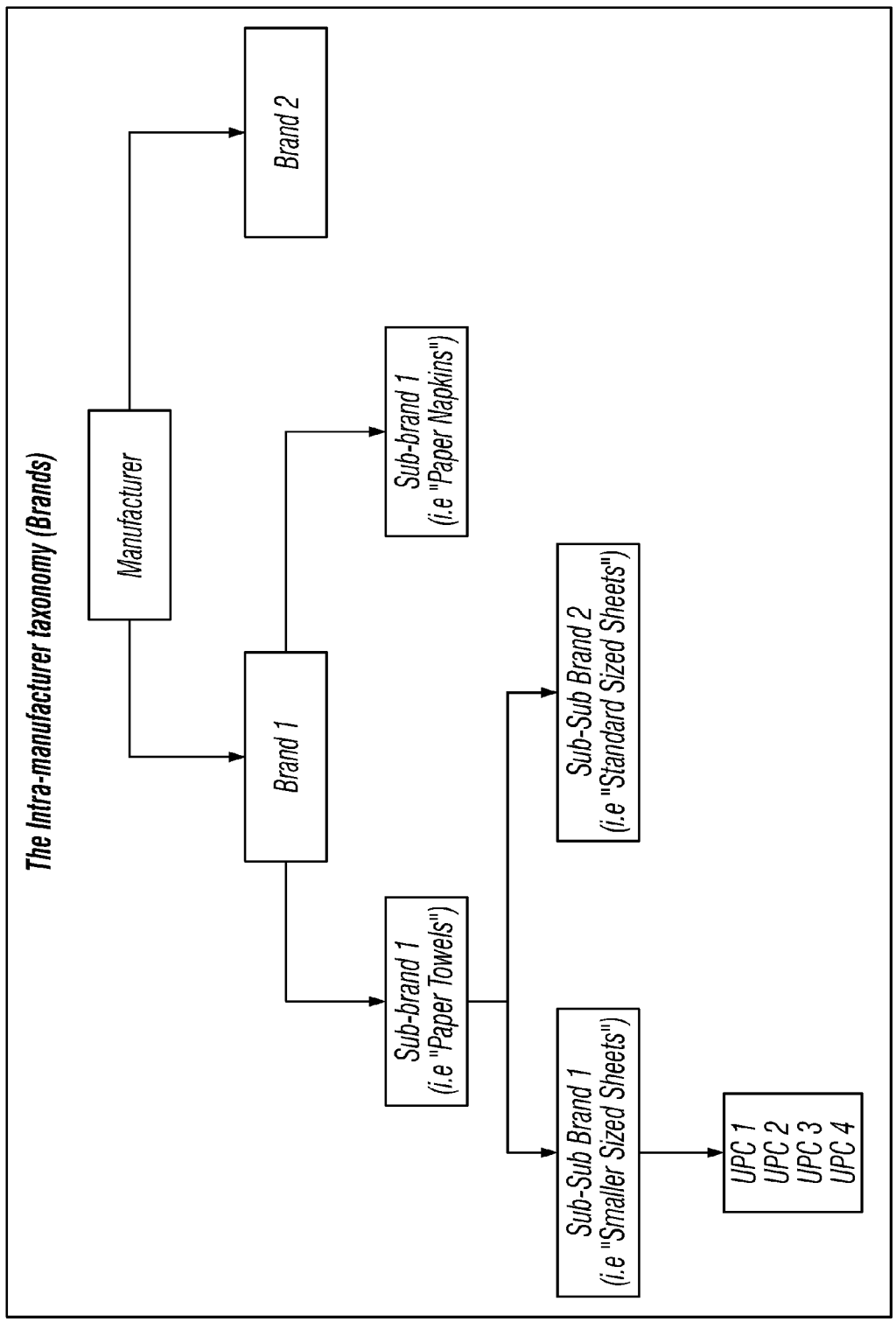
FIG. 6 illustrates that in the data analytics engine, any location on the campaign award system's taxonomy is a brand.

The analytics engine 22 has taxonomy of products from different product advertisers. The analytics engine 22 provides an organization of products into a hierarchy. In one embodiment, the hierarchy extends to an itemized receipt including uniform price code ("UPC"), stock keeping unit ("SKU") and menu items. In the data analytics engine 22, any location on this taxonomy as a "brand", as illustrated in FIG. 6.

Figure 7:
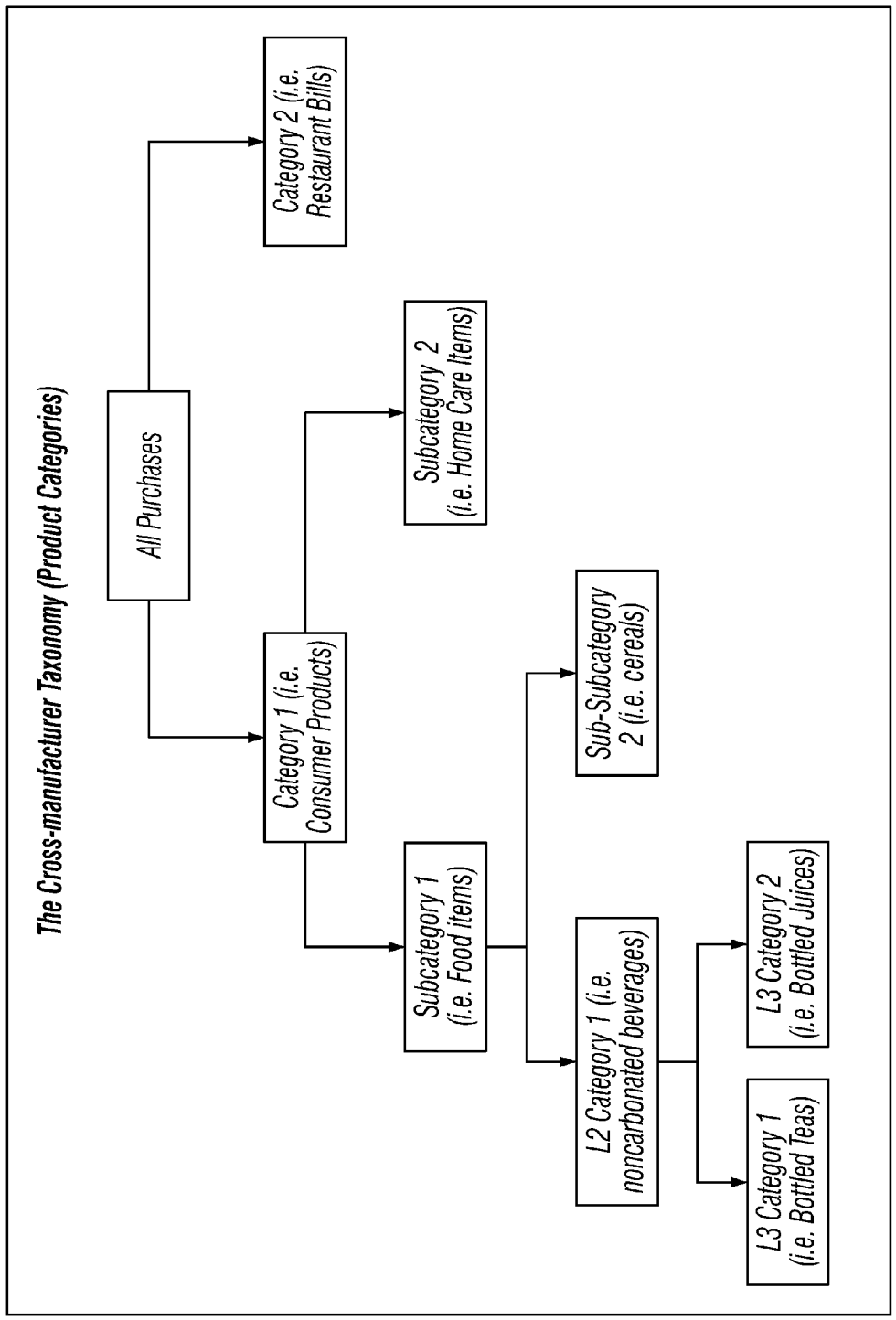
FIG. 7 illustrates that in the data analytics engine, any location on this taxonomy can be referred to as a Product Category.

With the present invention, any location on this taxonomy can be referred to as a "Product Category", see FIG. 7.

Figure 8:
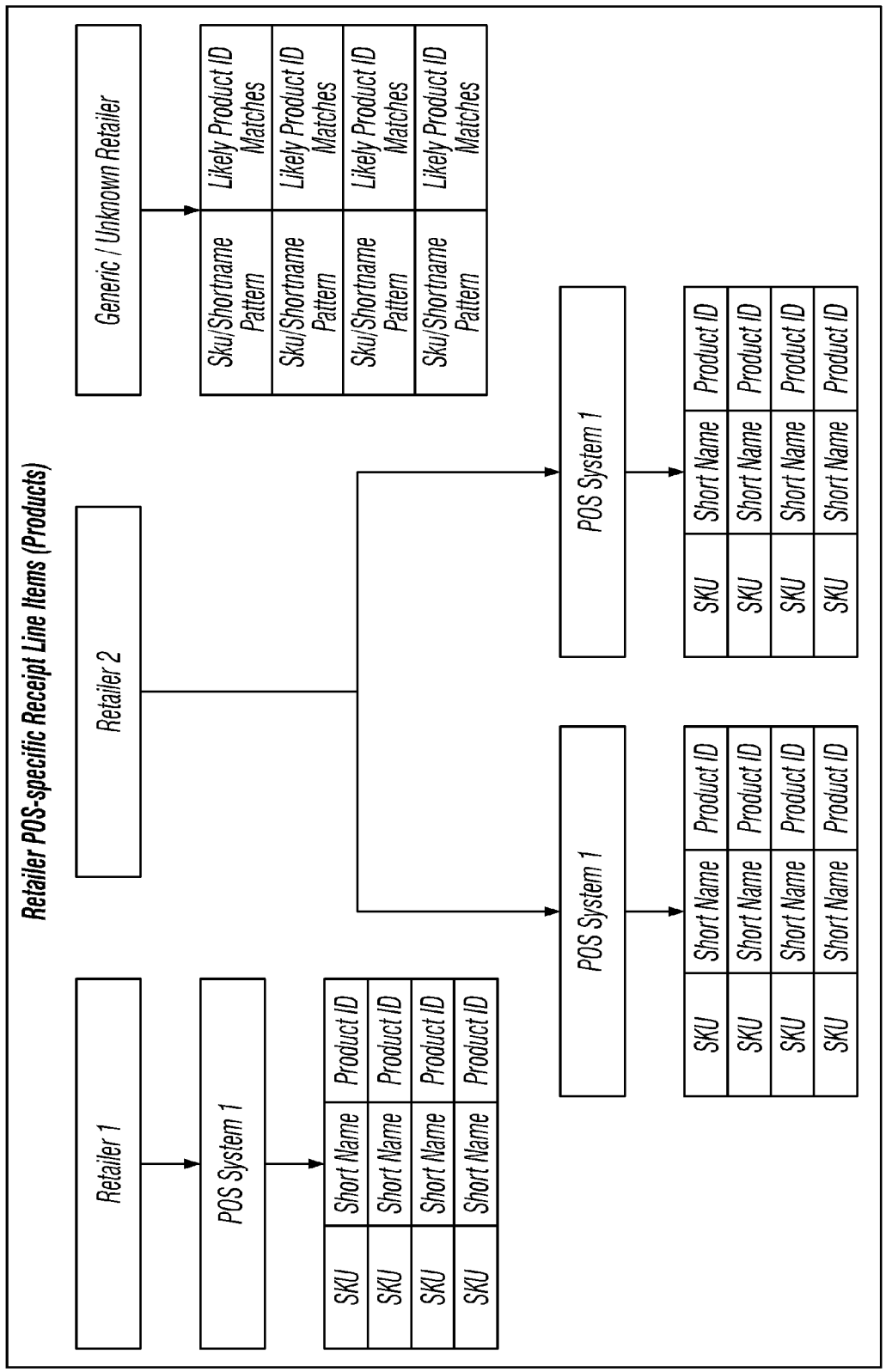
FIG. 8 illustrates that in one embodiment of the campaign offers and rewards system, a comprehensive list is created of the receipt line items, composed of some combination of an optional text "short name" and an optional numerical SKU for each unique retailer POS system that the campaign rewards and offers system has observed.

The campaign rewards system can create a comprehensive list of the receipt line items, composed of some combination of an optional text "short name" and an optional numerical "SKU", for each unique retailer POS system that the campaign rewards and offers system has observed. This is referred to these unique combinations of SKU and Shortname on a receipt from a specific retailer POS system as a "Product", as illustrated in FIG. 8.

The campaign rewards system can assign unique "Product IDs" to these receipt line item observations ("Products"), and then places those products with as much specificity as possible into the campaign rewards system Brand and Product Category taxonomies.

The data analytics engine also contains a set of general patterns that tend to appear across retailer POS system line items when referring to a specific manufacturer's product or a certain type of product. The analytics engine 22 can use these rules to extract useful product information when analyzing receipts from retailer POS systems for which a specific set of rules have not yet been identified.

The campaign rewards engine further associates a set of plain-text descriptors called "Tags" to the product IDs to record additional information about a particular product that may not lend itself to either the structured Brand or Product Category taxonomies.

The use of tags allows for the identification, for instance, of all household cleaning products and personal soaps that are free of fragrances and dyes, information which may be useful to a marketer for research or offer-targeting purposes, but which could not be easily captured in the existing taxonomies without creating significant additional complexity in their structures, as illustrated in FIG. 9.

The data analytics engine can identify that receipt line items from two different retailers refer to the same underlying product (i.e. ID4 and ID5 in the table above), allowing for powerful analysis of data gathered from receipts from multiple retailers. Examples are illustrated in FIG. 10.

Analytics data intelligence is coupled to a product database. The product database includes the following including relevant information about the product.

Analytics data intelligence is coupled to campaign reporting. The analytics engine 22 performs segmenting according to an advertiser's strategy.

In one embodiment, the analytics engine 22 predicts a probability that a user will redeem a given offer and estimate the reward the user will be owed when it redeems the offer, calculates an expected amount of a campaign budget that will be consumed if the user is presented with that offer, and estimates a payout that the campaign sponsor is likely to realize by providing the user with the offer.

In one embodiment, the analytics engine 22 uses product or category purchasing behavior of a group of users who have received an offer or other marketing intervention.

As a non-limiting example, the analytics engine 22 performs analytics on at least one of, users who have viewed the offer, users who have redeemed the offer, a number of units or products purchased, receipts submitted with redemptions, money spent on the product, rewards paid out, money spent on product per a selected dollar amount in rewards, performance against system benchmarks, detailed retailer, state and SKU record for each purchase and the like.

In one embodiment, the analytics engine 22 provides an analysis of a market share for different advertisers competing in a particular category.

In one embodiment, the analytics engine 22 uses product or category purchasing behavior of a group of users who have received an offer or other marketing intervention.

Figure 13:
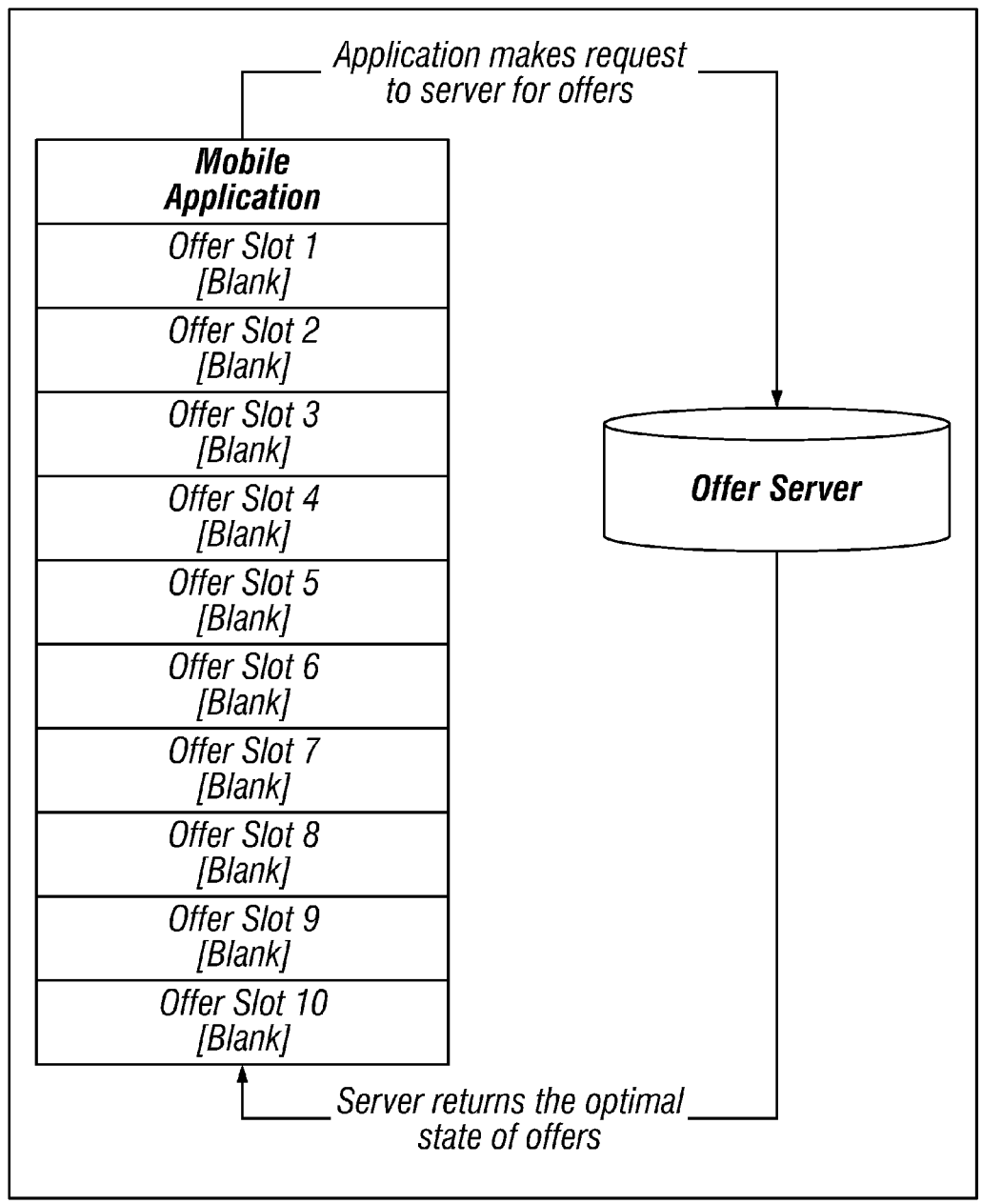
FIG. 13 illustrates that campaign offers and award system users are presented with a list of offers that can change on a regular basis to keep the application interesting for the user and to allow the campaign offers and rewards system to present users with the offers that make the most financial sense for the campaign award system and its customers.

An offer serving engine 24 serves the offer to the user. The offer serving engine 24 at least partially provides that offers displayed to users are in compliance with their associated contracts that the campaign reward system has signed with its advertisers. If a determination is made that a user meets an advertiser requirement, then an offer is made by the offer serving engine 24. In one embodiment, the offer serving engine 24 at least partially provides that a budget for a campaign is not exceeded and its objectives achieved. Campaign award system users are presented with a list of offers in the mobile application which they can choose to redeem in exchange for rewards. These offers change on a regular basis to keep the application interesting for the user and to allow the campaign rewards and offers system to present users with the offers that make the most financial sense for the campaign award system and its customers, as illustrated in FIG. 13.

To determine the slate of offers that it should display to the user, the user's the campaign rewards and offers system mobile application regularly requests a slate of offers from the campaign rewards and offers system offer engine, as illustrated in FIG. 14.

Figure 15:
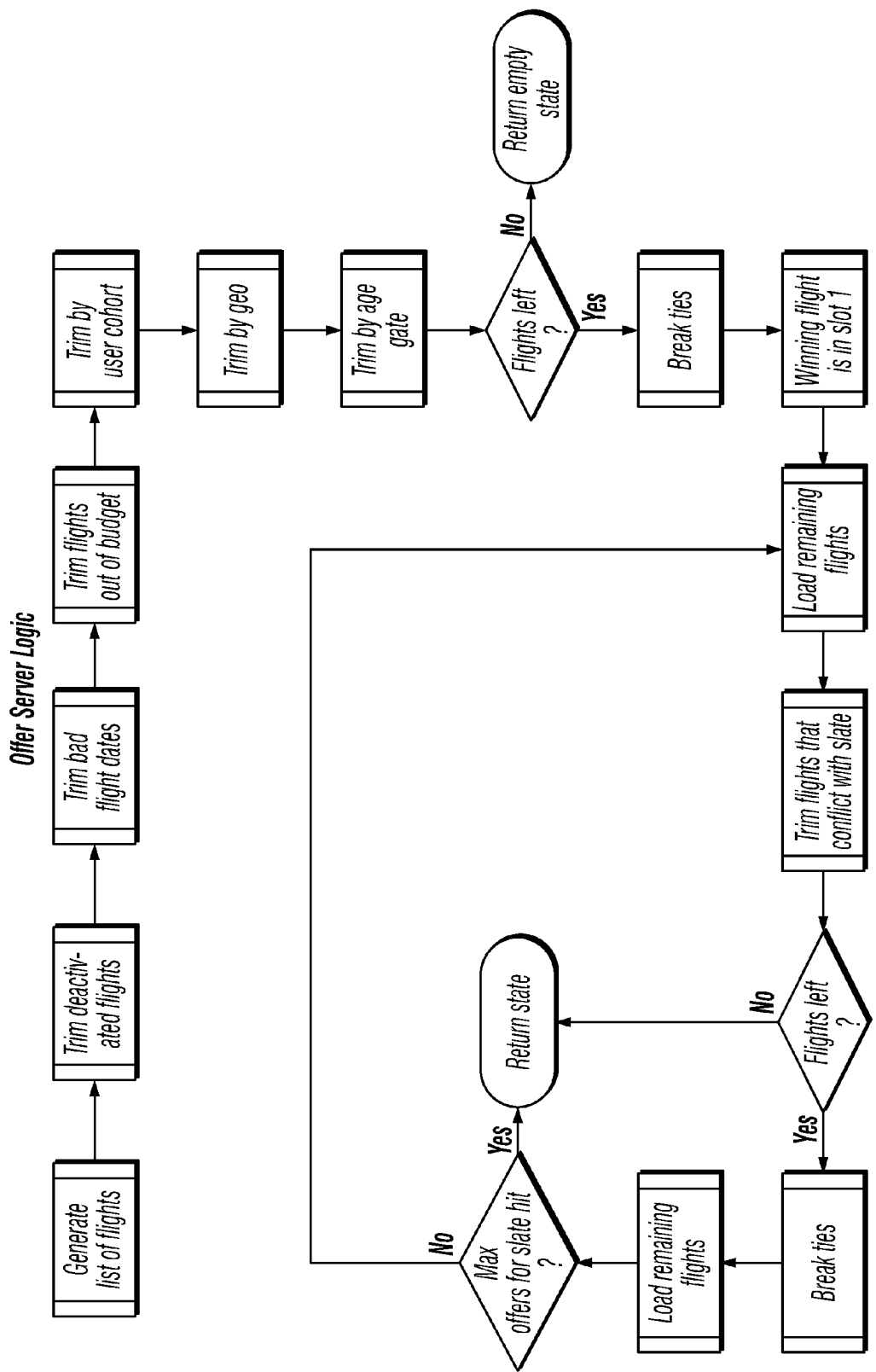
FIG. 15 illustrates an embodiment of the offer engine logic.

Referring to FIG. 14, the offer engine represents the contracts that the campaign rewards and offers system has signed with customers to run offer campaigns with two abstractions, offers and flights. FIG. 15 illustrates an embodiment of the offer engine logic.

The campaign rewards and offers system offer engine uses offer objects to store all of the information necessary to display an offer to a user and to calculate the rewards that the user should receive when he or she completes the offer, and flight objects to store all of the information necessary to ensure that the right offers are shown to the right the campaign rewards and offers system user at the right time, and that the budgets set by the campaign rewards and offers system's contracts with customers are spent but not exceeded.

The offer engine also has the notion of a user cohort—a list of the campaign rewards and offers system users that has been identified by the campaign rewards and offers system receipt analysis engine or some other process which the offer engine can use to ensure that a particular offer is shown only to users who are listed in the cohort (i.e. users who have characteristics that are particularly attractive to a campaign rewards and offers system customer), or, conversely, that a particular offer is never shown to users who are members of the cohort (i.e. users who already buy the product featured in the offer regularly, and therefore the campaign rewards and offers system customer would only lose margin on purchases that the user would have made anyway if the user was given and redeemed the offer).

The offer engine's goal is to:

Ensure that the offers displayed to the campaign rewards and offers system users are always in complete compliance with the contracts that the campaign rewards and offers system has signed with its customers—including honoring competitive exclusions and user targeting rules;

Spend the money budgeted to the campaign rewards and offers system campaigns by customers completely but without creating excess redemptions Balance the concerns of:

Users who derive value from the service when they receive offers that they will enjoy redeeming;

Customers who achieve the highest ROI when the campaign rewards and offers system user redeems an offer in a way that involves significant new revenue to the customer at the time of redemption and potentially during future shopping trips; and The campaign award system, which may earn different margins when one offer is redeemed by a user versus another that is governed by a different customer contract.

When the offer engine receives a request for a slate of offers for a particular user's device, it uses the following heuristic (described first in text and then in the flowchart below) to optimize how it accomplishes these goals:

Determine which add fits in slot 1 (featured);
Generate a list of all active flights in the system;
Are within their start & end dates;
Are within their budgets;

Have not been manually stopped or paused;

Filter out active flights that are ineligible for this user/feed combination;

Flights that have exceeded their user frequency cap;

Flights that require the user to be a member of a cohort that the user is not a member of;

Flights with geographic targeting requirements that are not met;

Flights where the offer payload has a user age restriction that is not met by the user (beer/liquor);

Break ties between eligible flights if necessary;

Filter to flights from highest priority level;

Break ties;

Provide campaign pacing;

Revenue implications, expected user/offer redemption, etc. are also considered;

If no flight available for slot 1, display no offer page state;

If a flight is available for slot 1, determine which slot fits in slot 2;

Repeat 1*a*;

Filter out flights that conflict with the flight in slot 1;

Offers for the same product/family of products;

Directly competitive offers;

Repeat 1*b*;

Repeat 1*c*;

If no flight is available for slot 2, display no-non-featured-offer page state; Content;

Repeat (3) for slots 3—Max, truncating offer list and displaying the page if A "no offer" result is hit before the max number; and Display page with max set of offers.

FIG. 15 illustrates an embodiment of the offer engine logic

The redemption engine 26 provides for redemption of offers. The redemption engine 26 is in communication with a database, that includes a reward budget, and controls redemption of rewards in view of the reward budget and in response to a communication from the analytics engine 22. The system provides a range of redemption of an offer for a reward. The redemption engine 26 provides for cost-effective user redemption of offers or rewards.

The analytics engine 22, with data intelligence, identifies receipt line items and ties SKU's from different receipts to create a list of products and services not matched to advertisers. The redemption engine 26 is in communication with a database that includes a reward budget. The redemption engine 26 along with the analytics engine 22 controls redemption of rewards in view of the reward budget. When a campaign budget has been met, the analytics engine 22 can turn off a campaign.

As a non-limiting example, the offers or rewards can be, single purchase offers, multiple purchase offers, social offers, loyalty offers.

In one embodiment, offers or rewards are made without a store loyalty card or a coupon.

In one embodiment, the processing engine provides offers and rewards as a percentage cash back after all other discounts have been applied. As a non-limiting example, each of offer unit received by a user has a maximum cash back value and a maximum number of products it can be applied to. This varies by the offer unit.

A target engine provides an award in response to at least one of, retailer, basket and shopper targeting. The targeting engine 20 provides targeting of users to serve personalized product and brand offers based on one or more of, historical purchase data and shopper cohorts from receipts, social media data and demographic data and the like. The targeting engine 20 provides high targeting of users in response analysis conducted by the analysis engine. In one embodiment, the targeting engine 20 provides targeting of users that is not based on retailer or POS relationships.

In one embodiment, logic for targeting is used to determine flights for a user's feed as follows:

Determine which add fits in slot 1 (featured);

Generate a list of all active flights in the system;

Are within their start & end dates;

Are within their budgets;

Have not been manually stopped or paused;

Filter out active flights that are ineligible for this user/feed combination;

Flights that have exceeded their user frequency cap;

Flights that require the user to be a member of a cohort that the user is not a member of;

Flights with geotargeting requirements that are not met;

Flights where the offer payload has a user age restriction that is not met by the user (beer/liquor);

Break ties between eligible flights if necessary;

Filter to flights from highest priority level;

Break ties;

Campaign pacing;

Long term algorithm also ends up looking at revenue implications, expected user/offer redemption and the like;

If no flight available for slot 1, display no offer page state; Content;

If a flight is available for slot 1, determine which slot fits in slot 2;

Repeat 1*a*;

Filter out flights that conflict with the flight in slot 1;

Offers for the same product/family of products;

Directly competitive offers;

Repeat 1*b*;

Repeat 1*c*;

If no flight available for slot 2, display no-non-featured-offer page state;

Content;

Repeat (3) for slots 3—Max, truncating offer list and displaying the page if a "no offer" result is hit before the max number;

Display page with max set of offers; and

High-level requirements for implementation of social offers.

A fraud detection engine 18 recognizes in-market promotions. In one embodiment, the fraud detection engine 18 reviews submission of unusual receipts. As a non-limiting example, these unusual receipts can, share a banner and transaction identification with a previously recorded receipt, have unusual quantities purchased or prices paid for an item related to an offer, have inconsistent data and the like. The fraud detection engine 18 collects and analyzes user data to reduce fraud, performs detection of suspicious activity, verifies the suspicious activity and in response to a detection of fraud applies a punishment. The fraud detection engine 18 analyzes data to identify suspicious receipts, user account and transaction patterns, and the like.

In one embodiment, the fraud detection engine 18 in combination with other elements, contacts a suspicious user. The system can apply a punishment for fraudulent activity. As a non-limiting example, the punishment can be, rejecting a receipt and closing a user's account and the like.

In various embodiments, the fraud detection engine 18 reviews information from receipts, traded coupons and a pre-market promotion, detects store-level abuse from receipt data and the like.

Figure 3:
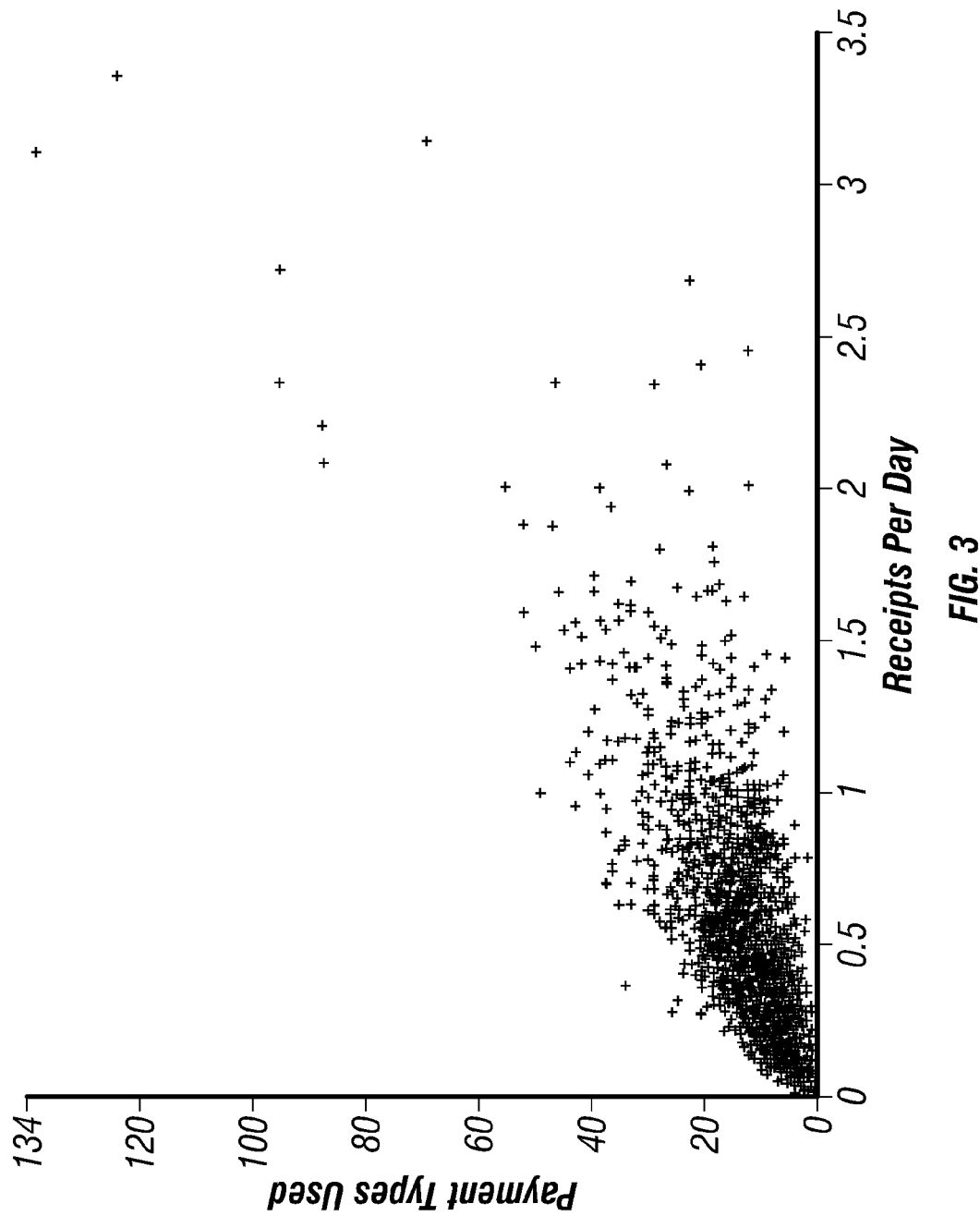
FIG. 3 illustrates detection of a coupon abuser.
Figure 4:
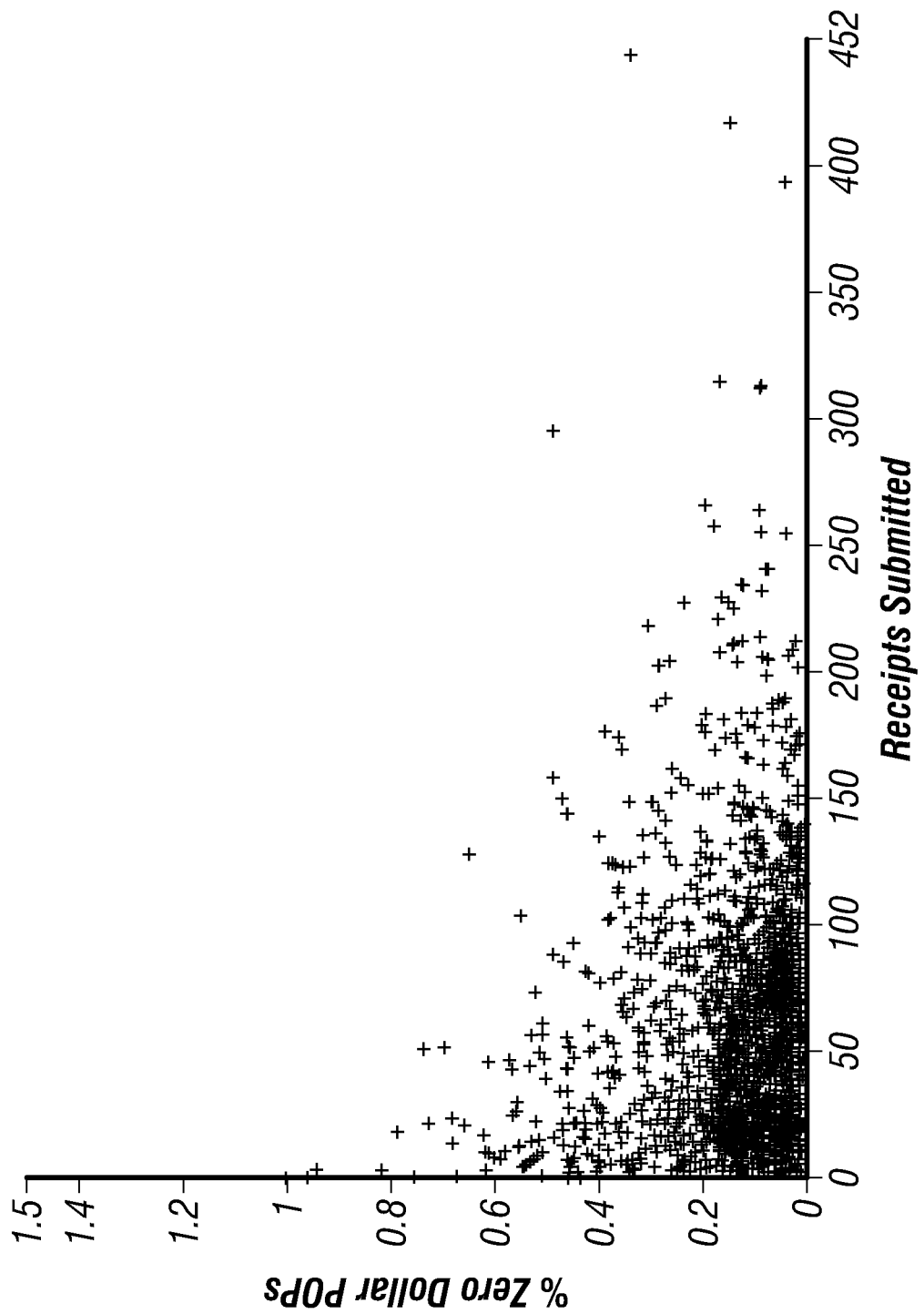
FIG. 4 illustrates an example of a user that submitted a high volume of receipts with a high percentage of items that were free to the user after coupons.

FIG. 3 illustrates detection of a coupon abuser where payment types used are plotted again receipts per day. FIG. 4 illustrates an example of a user that submitted a high volume of receipts with a high percentage of items that were free to the user after coupons. This triggered an audit of the user's account. Receipts submitted are plotted against the percent of zero dollar offer rewards.

Figure 5:
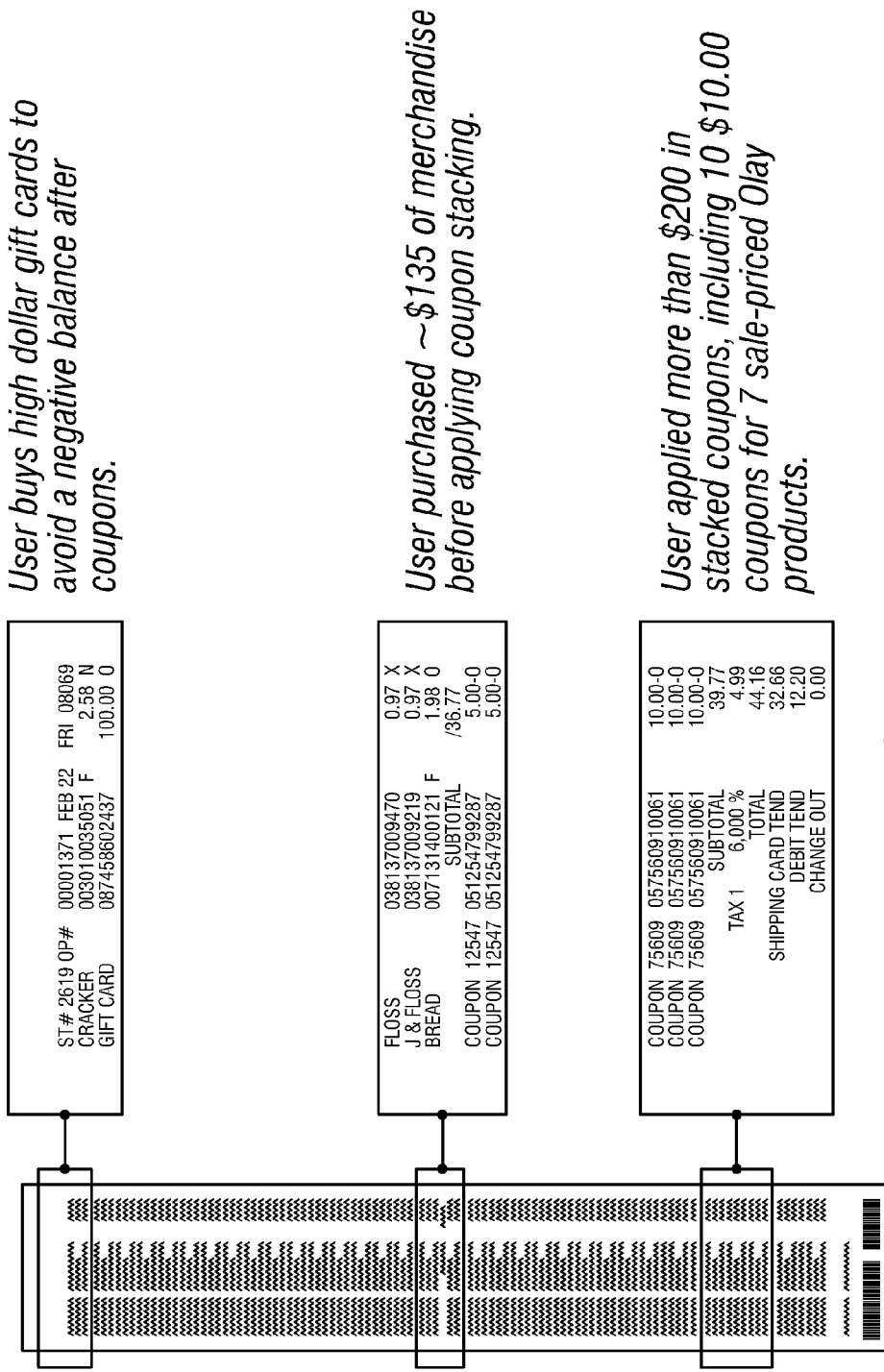
FIG. 5 illustrates that the campaign offers and rewards systems can detect store-level abuse directly from receipt data.

FIG. 5 illustrates that the campaign rewards system can detect store-level abuse directly from receipt data.

In one embodiment, the system is coupled to at least one payment system which is coupled to a user's financial account or to a user's financial institution. The user's financial account can be a variety of different accounts including but not limited to, a bank account, credit card, debit card, pre-paid card, and a third party funding source. The system can also be directly coupled to a user's financial institution. The user's financial institution can be an entity that provides the user with a user financial transaction card.

In various embodiments, the user's financial transaction card can be a credit financial transaction card, debit financial transaction card, gift financial transaction card, fund transfer financial transaction card, other types of payment authenticating mechanisms capable of carrying out a transfer of funds and the like.

Confirmation is made that users who receive and redeem offers for rewards have purchasing characteristics to make the offer for the reward provided by a campaign reward on the behalf of an advertiser.

The system ties rewards to a population, and a campaign budget. Offers and rewards within a campaign budget.

In various embodiments, the system provides a range of associated costs to an advertiser.

An advertiser is provided by the system with a certainty about how much of a campaign offer budget will be spent.

The system includes a database of a cross-retailer shopper's purchaser history. This database can also include a budget of offers for a campaign or a separate database can be included.

The receipt intelligence engine 14 associates a set of descriptors to product IDs. The descriptors provide additional information about a product and are used for identification of product types.

In one embodiment, product and service categories are created using cross-advertiser and service-provider organizational taxonomy for goods and services.

In one embodiment, the receipt engine creates a list of the receipt line items for each ("UPC") item, stock keeping unit ("SKU") and menu items. The taxonomy for goods and services is used to compare information about similar goods or services. In one embodiment, the taxonomy for goods and services is used to compare information about similar goods or services sold by different entities, retailers or service providers.

The analytics engine 22 identifies same or similar products for a plurality of receipts, and also provides for rapid recognition of products on user-submitted receipts.

In one embodiment, the analytics engine 22 provides an analysis of a market share for different advertisers competing in a particular category. In various embodiments, the analytics engine 22 uses information from, receipts, users, product consumption from receipts in different retail channels, product consumption information in geographic locations, information by users in demographic or psychographic groups and the like.

In one embodiment, the campaign reward system includes the redemption engine 26 which can have a campaign reward server, a memory or database for storing offer reward data and the analytics engine 22. The analytics engine 22 extracts information about one or more items purchased by a user, analyzes it, predicts a probability that a user will redeem a given offer and estimates a reward the user will be owed when it redeems the offer. The redemption engine 26, in communication with a database that includes a reward budget, controls redemption of rewards in view of the reward budget and in response to a communication from the analytics engine 22.

In one embodiment, the analytics engine 22 calculates an expected amount of a campaign budget that will be consumed if the user is presented with the offer. The analytics engine 22 can estimate long term revenue that the campaign sponsor is likely to realize by providing the user with the offer.

In one embodiment, a memory stores offer reward data. The analytics engine 22 predicts a probability that a user will redeem a given offer, estimate a reward the user will be owed when it redeems the offer and calculate an expected amount of the campaign's budget that will be consumed if the user is presented with that offer. In another embodiment, the analytics engine 22 measures a return on an investment for campaign reward system offers or other marketing interventions.

In one embodiment, the analytics engine 22 uses product or category purchasing behavior of a group of users who have received an offer or other marketing intervention.

In one embodiment, the analytics engine 22 looks at a current state of a campaign rewards budget, an attractiveness of a user relative to a campaign, and makes a decision to give the user a campaign reward offer.

In various embodiments, the system manages offers and rewards within a budget. The analytics engine 22 can estimate long term revenue that an advertiser is likely to realize by providing the user with the offer.

The system can be coupled to a mobile device, a payment system, the analytics engine 22 and the receipt intelligence engine 14 coupled with a digitized receipt on any platform, a campaign offers API configured to be interfaced with a third party platform and the like.

In response to a third party ping of the offers API, the system matches item-level data from the ping to an offer, processes and conducts a payout. In one embodiment, in response to communication with the campaign offers API, at least a portion of a user's purchases are matched with offers. When at least a portion of the user's purchases are matched with offers, the user can receive a cash reward.

In one embodiment, the offer engine is coupled to one or more social networks and provides a social offer, from one social network member to another social network member, and for advertiser digital properties to a social network member. A user that is a member of a social network can receive a social offer feed from the system and install an application. All or some of a user's social network friends can click on a social offer and receive the offer from the system. In one embodiment, the social offer has a visual treatment that distinguishes it from a traditional offer in a feed. In one embodiment, when a required number of friends purchase the offer, the endorser is rewarded with a bonus.

A social offer is a brand offer that is shared from an endorser to its friends and provides unique incentives for both parties. The social offer accomplishes a variety of goals, including but not limited to, (i) brand partners—provides the opportunity to incent viral product sales in stores leveraging an existing customer relationship, (ii) consumers—provides unique cash back opportunity for buying/trying branded products, (iii) endorser—provides the potential incentive to earn a bonus for sharing the offer with her friends, (iv) campaign rewards system—provides the quickest way to incent app downloads and generate revenue.

As a non-limiting example, the brand partner selects consumer segment(s) (i.e. heavy brand buyers based on purchase history) and provides them (the endorser) with a unique offer for certain products with higher-than-usual cash back rewards that they can give to their friends. The endorser may see the social offer before it purchases the product and may need to purchase the product before being able to unlock and share the social offer. Once the social offer is unlocked, the endorser can post the offer to Facebook® and its friends can click and claim to offer.

The offer then shows up in its feed once it downloads and installs the app. There is a limit to the number of Facebook® friends that can click and claim the offer, preventing uncontrolled viral distribution and potential fraud. The social offer should have a visual treatment that distinguishes it from the traditional offer in the feed. Once the required number of friends purchase the offer, the endorser is rewarded the bonus.

As a non-limiting example, the reward can work as follows:

EXAMPLE 1

Friends 1 to n: each earn 50% cash back when she buys a branded toilet paper; endorser: earns 100% cash back when 5 of her friends claim the offer for branded toilet paper.

In one embodiment, the system accesses a set of user records containing transaction data for a plurality of users. Transactions are correlated in a first set of input classes that occurred in a first time period to transactions in a first correlated class that occurred in a second time period. The second time period is subsequent to the first time period and defines first input class correlation data for said first set of input classes. At least a portion of data of the first input class correlation data is used to represent a statistical correlation between the existence of transactions that occurred in at least one transaction class in the first set of input classes with transactions that occurred in the first correlated class in the second time period. Not all of the data is used. Some of the data is used for user segmentation or offer targeting. A decision is then made whether to issue a campaign reward to a user for their transaction in response to the correlation.

In one embodiment, a computer implemented method of campaign rewards uses the receipt intelligence engine 14 with processor and receipt processing. The offer serving engine 24, which includes a campaign reward server, receives an access request from a user mobile device associated with the user. A first identifier and a network server identifier (NID) that corresponds to the access request to the campaign reward engine are sent in response to receipt processing. A determination is made as to available rewards to the user.

In one embodiment, the receipt intelligence engine 14 with processor and receipt processing are provided with the offer serving engine 24 and a memory for storing offer reward data. The analytics engine 22 selects offer reward data from the memory depending on a purchase of a first item. The analytics engine 22 has a database or memory for storing offer reward data defining a first offer reward associated with a purchase of the first item from receipt processing.

In one embodiment, the receipt intelligence engine 14, processor and receipt processing are provided. The analytics engine 22 has a database or memory that stores at least a plurality of consumer records. Each record includes at least one of transaction data indicating identification of product purchased and date of purchase. The analytics engine 22 executes a predictive model function and determines values representing statistical correlations using receipt processing. In response to an analysis of the data intelligence and use of the statistical correlations, a decision is made relative to giving a user an offer for a reward. The analytics data intelligence can be coupled to data products. The analytics data intelligence can be coupled to campaign reporting.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method implemented at a server computer, the method comprising:
   processing, using a processor, an image of a physical receipt captured by an image capture device to extract data therefrom, wherein the image is a photographed image or a scanned image associated with a user, and wherein the extracted data includes a line item identifying a first good or service purchased from a first seller;
   associating the line item with a first category according to a taxonomy of goods and services, wherein the taxonomy defines a mapping of goods or services into categories such that goods or services that are similar to or the same as the purchased good or service are associated with the same category;
   automatically identifying a second good or service that is sold by a second seller, wherein the second good or service is associated with the first category;
   generating an offer for the second good or service, wherein the offer includes an agreement to provide a compensation to the user in exchange for the user purchasing the second good or service; and
   providing the user with the offer for the second good or service.

2. The method of claim 1, wherein processing the image includes using an optical character recognition system.

3. The method of claim 1, wherein the first good or service is associated with a first brand and the second good or service is associated with a second brand different from the first brand.

4. The method of claim 1, further including:
   associating a unique product identifier with the line item;
   associating a tag with the unique product identifier, wherein the tag is a plain-text descriptor of the good or service associated with the unique product identifier;
   identifying a third good or service that is also associated with the tag; and
   providing the user with an offer for the third good or service having a second unique product identifier associated with the tag, wherein the offer for the third good or service applies to a purchase from a seller other than the first seller.

5. The method of claim 1, wherein the taxonomy includes one or more of the following categories: a product category, a product subcategory, a manufacturer category or a brand category.

6. The method of claim 1, wherein the extracted data further includes one or more of the following: seller-identifying information, a price associated with the first good or service, a total transaction price, a stock-keeping-unit number associated with the first good or service, a universal product code associated with the first good or service, a payment method, a transaction identifier, a location, a date, or a coupon.

7. A computer-readable storage medium having stored thereon executable instructions that, when executed by one or more processors of a computer system, cause the computer system to execute a method comprising:
   processing, using the one or more processors, an image of a physical receipt captured by an image capture device to extract data therefrom, wherein the image is a photographed image or a scanned image associated with a user, and wherein the extracted data includes a line item identifying a first good or service purchased from a first seller;

associating the line item with a first category according to a taxonomy of goods and services, wherein the taxonomy defines a mapping of goods or services into categories such that goods or services that are similar to or the same as the purchased good or service are associated with the same category;

automatically identifying a second good or service that is sold by a second seller, wherein the second good or service is associated with the first category;

generating an offer for the second good or service, wherein the offer includes an agreement to provide a compensation to the user in exchange for the user purchasing the second good or service; and providing the user with the offer for the second good or service.

8. The computer-readable storage medium of claim 7, wherein processing the image includes using an optical character recognition system.

9. The computer-readable storage medium of claim 7, wherein the first good or service is associated with a first brand and the second good or service is associated with a second brand different from the first brand.

10. The computer-readable storage medium of claim 7, further including:

associating a unique product identifier with the line item;

associating a tag with the unique product identifier, wherein the tag is a plain-text descriptor of the good or service associated with the unique product identifier;

identifying a third good or service that is also associated with the tag; and providing the user with an offer for the third good or service having a second unique product identifier associated with the tag, wherein the offer for the third good or service applies to a purchase from a seller other than the first seller.

11. The computer-readable storage medium of claim 7, wherein the taxonomy includes one or more of the following categories: a product category, a product subcategory, a manufacturer category or a brand category.

12. The computer-readable storage medium of claim 7, wherein the extracted data further includes one or more of the following: seller-identifying information, a price associated with the first good or service, a total transaction price, a stock-keeping-unit number associated with the first good or service, a universal product code associated with the first good or service, a payment method, a transaction identifier, a location, a date, or a coupon.

13. A computer system comprising:

a memory configured to store an image of a physical receipt captured by an image capture device, wherein the image is a photographed image or a scanned image associated with a user; and a processor coupled to the memory and configured to:

process the stored image to extract data therefrom, wherein the extracted data includes a line item identifying a first good or service purchased from a first seller;

associate the line item with a first category according to a taxonomy of goods and services, wherein the taxonomy defines a mapping of goods or services into categories such that goods or services that are similar to or the same as the purchased good or service are associated with the same category;

automatically identify a second good or service that is sold by a second seller, wherein the second good or service is associated with the first category;

generate an offer for the second good or service, wherein the offer includes an agreement to provide a compensation to the user in exchange for the user purchasing the second good or service; and provide the user with the offer for the second good or service.

14. The computer system of claim 13, wherein the processor is further configured such that processing the stored image includes using an optical character recognition system.

15. The computer system of claim 13, wherein the first good or service is associated with a first brand and the second good or service is associated with a second brand different from the first brand.

16. The computer system of claim 13, wherein the processor is further configured to:

associate a unique product identifier with the line item;

associate a tag with the unique product identifier, wherein the tag is a plain-text descriptor of the good or service associated with the unique product identifier;

identify a third good or service that is also associated with the tag; and provide the user with an offer for the third good or service having a second unique product identifier associated with the tag, wherein the offer for the third good or service applies to a purchase from a seller other than the first seller.

17. The computer system of claim 13, wherein the taxonomy includes one or more of the following categories: a product category, a product subcategory, a manufacturer category or a brand category.

18. The computer system of claim 13, wherein the extracted data further includes one or more of the following: seller-identifying information, a price associated with the first good or service, a total transaction price, a stock-keeping-unit number associated with the first good or service, a universal product code associated with the first good or service, a payment method, a transaction identifier, a location, a date, or a coupon.

* * * * *